(12) United States Patent
Sasaki et al.

(10) Patent No.: US 8,693,103 B2
(45) Date of Patent: Apr. 8, 2014

(54) DISPLAY DEVICE AND DISPLAY METHOD

(75) Inventors: Takashi Sasaki, Kanagawa-ken (JP);
Aira Hotta, Kanagawa-ken (JP);
Akihisa Moriya, Tokyo (JP); Haruhiko Okumura, Kanagawa-ken (JP); Miwako Doi, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 85 days.

(21) Appl. No.: 13/420,183

(22) Filed: Mar. 14, 2012

(65) Prior Publication Data
US 2012/0170130 A1 Jul. 5, 2012

Related U.S. Application Data

(63) Continuation of application No. PCT/JP2009/066750, filed on Sep. 28, 2009.

(51) Int. Cl.
*G02B 27/14* (2006.01)
*G09G 5/00* (2006.01)

(52) U.S. Cl.
USPC .................................... 359/630; 345/7; 345/9

(58) Field of Classification Search
USPC .................................. 359/629–632; 345/7–9
See application file for complete search history.

(56) References Cited

U.S. PATENT DOCUMENTS

| 2009/0135374 | A1 | 5/2009 | Horiuchi et al. |
| 2009/0201225 | A1 | 8/2009 | Okada et al. |
| 2009/0237803 | A1 | 9/2009 | Hotta et al. |
| 2009/0243963 | A1 | 10/2009 | Hotta et al. |
| 2009/0244702 | A1 | 10/2009 | Okada et al. |
| 2009/0286401 | A1 | 11/2009 | Ichinose et al. |
| 2010/0066832 | A1 | 3/2010 | Nagahara et al. |
| 2010/0066925 | A1 | 3/2010 | Nagahara et al. |
| 2010/0066984 | A1 | 3/2010 | Horiuchi et al. |
| 2010/0073579 | A1 | 3/2010 | Okada et al. |
| 2010/0073636 | A1 | 3/2010 | Sasaki et al. |
| 2010/0073773 | A1 | 3/2010 | Hotta et al. |
| 2010/0157430 | A1 | 6/2010 | Hotta et al. |
| 2010/0164702 | A1 | 7/2010 | Sasaki et al. |
| 2010/0214635 | A1 | 8/2010 | Sasaki et al. |
| 2011/0001639 | A1 | 1/2011 | Sasaki et al. |

FOREIGN PATENT DOCUMENTS

| JP | 08-086661 | 4/1996 |
| JP | 09-325042 | 12/1997 |
| JP | 2006-017626 | 1/2006 |
| JP | 2006-284458 | 10/2006 |
| JP | 2009-098501 | 5/2009 |
| JP | 2009-128565 | 6/2009 |

OTHER PUBLICATIONS

International Search Report for International Application No. PCT/JP2009/066750 mailed on Oct. 27, 2009.
Written Opinion for International Application No. PCT/JP2009/066750.

*Primary Examiner* — Alicia M Harrington
(74) *Attorney, Agent, or Firm* — Amin, Turocy & Watson, LLP

(57) ABSTRACT

According to one embodiment, a display device includes an image projection unit. The image projection unit is configured to project a light flux toward one eye of a human viewer by using a projection plate to reflect the light flux. The light flux includes an image including a display object having a vanishing point. The projection plate is reflective and transmissive. The image projection unit is configured to dispose the vanishing point of the display object at a position different from a position of a vanishing point of a background image viewed by the human viewer through the projection plate.

18 Claims, 22 Drawing Sheets

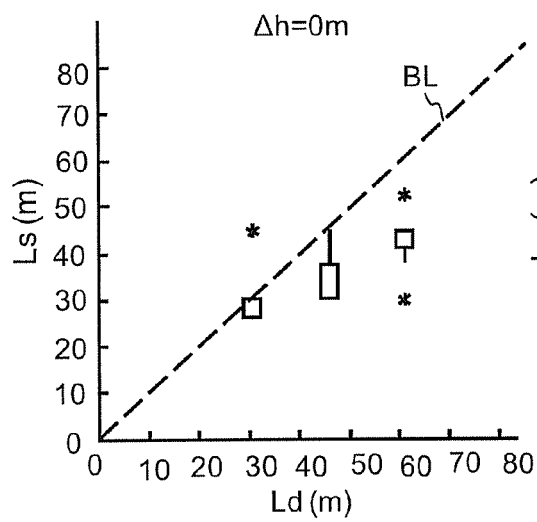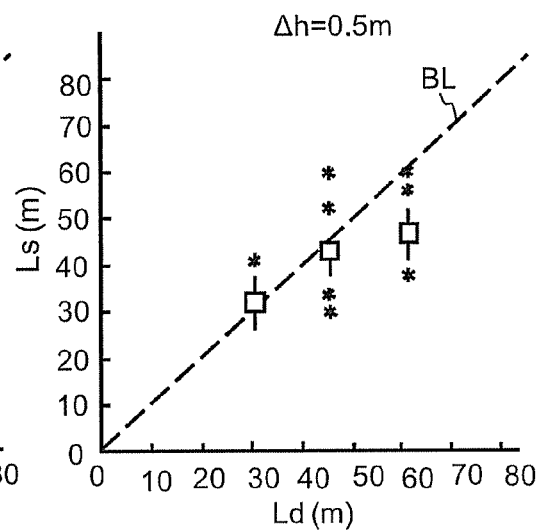
FIG. 13A      FIG. 13B
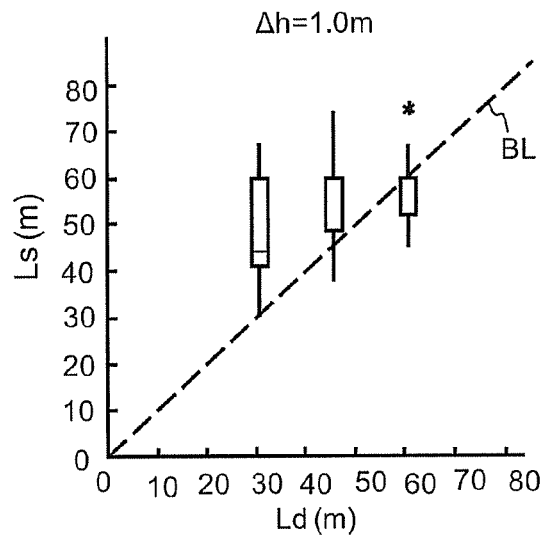
FIG. 13C

DISPLAY DEVICE AND DISPLAY METHOD

CROSS-REFERENCE TO RELATED APPLICATIONS

This is a continuation application of International Application PCT/JP2009/066750, filed on Sep. 28, 2009; the entire contents of which are incorporated herein by reference.

FIELD

Embodiments of the invention described herein relate generally to a display device and a display method.

BACKGROUND

Head-up displays (HUDs) are being developed as automotive display devices to project display information such as destination navigation information and the like onto a windshield to allow simultaneous visual confirmation of the external environment information and the display information. Although the display of the HUD is viewed with both eyes in the case of a normal HUD, binocular parallax occurs and the display is difficult to view.

Conversely, a monocular HUD has been proposed in which the display is viewed with one eye (for example, refer to JP-A 2009-128565 (Kokai)). According to such a monocular HUD, a virtual image of the display object can be perceived at a spatial position that is matched to the background.

In such a monocular HUD, it is desirable for the depthward position at which the display object is disposed to match the perceived depthward position at which the display object is actually perceived with even higher precision.

BRIEF DESCRIPTION OF THE DRAWINGS

FIG. 13A to FIG. 13C are graphs showing the experimental results of the display device;

DETAILED DESCRIPTION

Figure 1A:
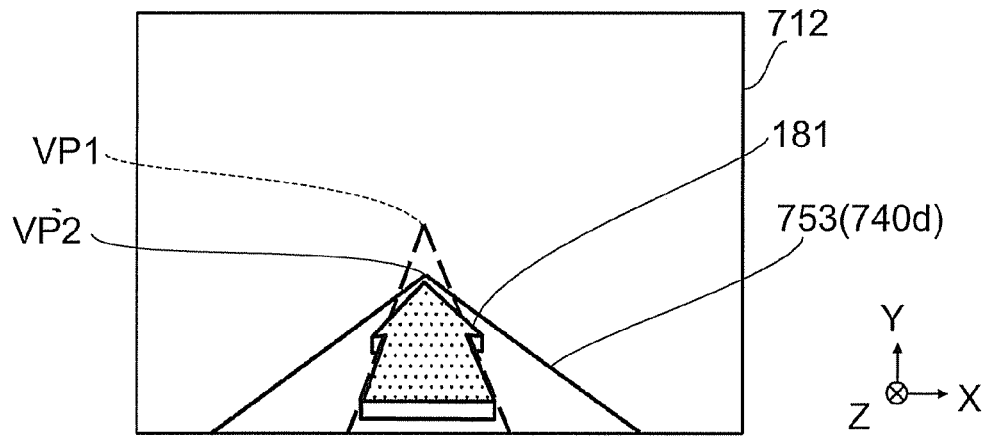
FIG. 1A to FIG. 1C are schematic views showing operations of a display device.

According to one embodiment, a display device includes an image projection unit. The image projection unit is configured to project a light flux toward one eye of a human viewer by using a projection plate to reflect the light flux. The light flux includes an image including a display object having a vanishing point. The projection plate is reflective and transmissive. The image projection unit is configured to dispose the vanishing point of the display object at a position different from a position of a vanishing point of a background image viewed by the human viewer through the projection plate.

According to one embodiment, a display method is disclosed. The method can include projecting a light flux including an image including a display object toward one eye of a human viewer by using a projection plate to reflect the light flux. The projection plate is reflective and transmissive. The method can include disposing a vanishing point of the display object at a position different from a position of a vanishing point of a background image viewed by the human viewer through the projection plate during the projecting toward the one eye.

Embodiments of the invention will now be described in detail with reference to the drawings.

The drawings are schematic or conceptual; and the relationships between the thicknesses and the widths of portions, the proportions of sizes among portions, etc., are not necessarily the same as the actual values thereof. Further, the dimensions and the proportions may be illustrated differently among the drawings, even for identical portions.

In the specification and the drawings of the application, components similar to those described in regard to a drawing thereinabove are marked with like reference numerals, and a detailed description is omitted as appropriate.

First Embodiment

Figure 1B:
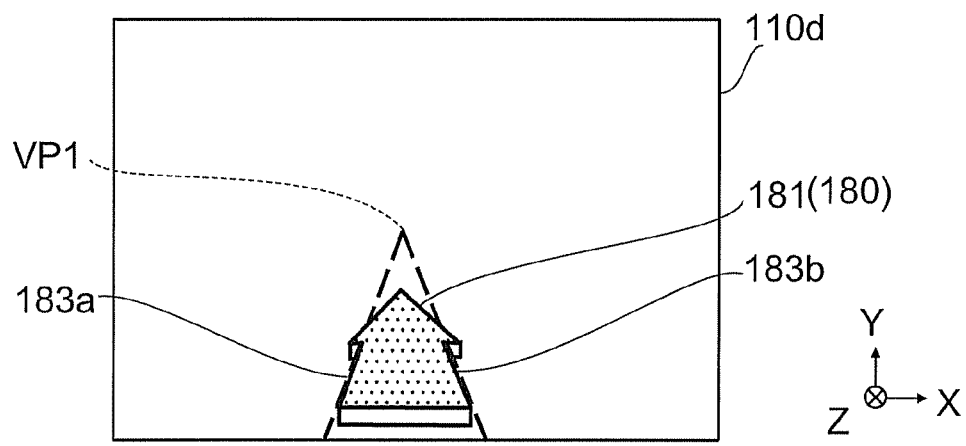
Figure 1C:
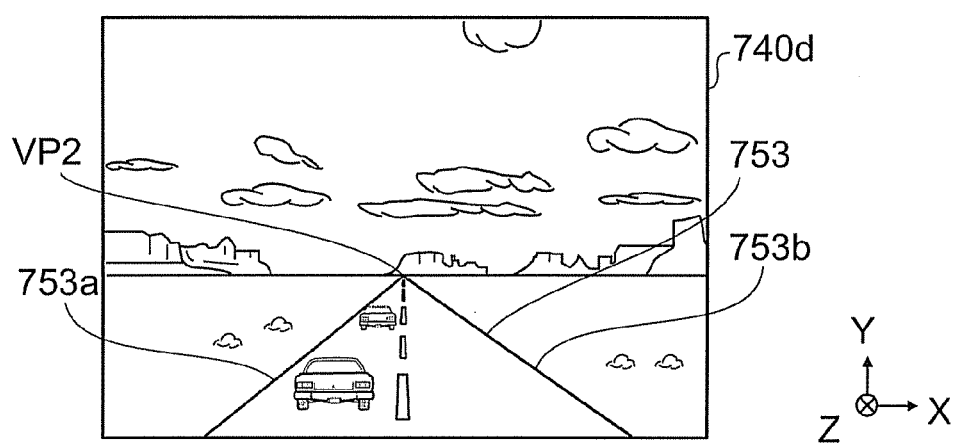

FIG. 1A to FIG. 1C are schematic views illustrating operations of a display device according to a first embodiment.

Figure 2:
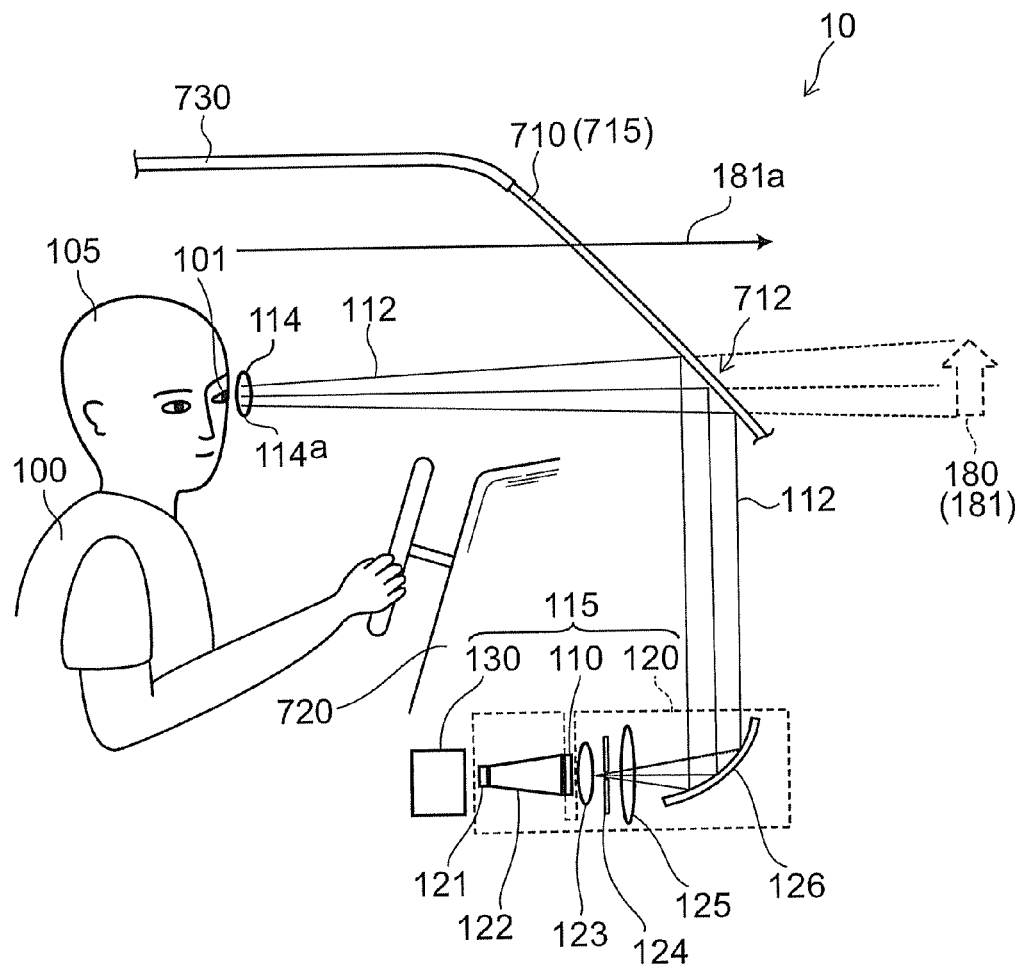
FIG. 2 is a schematic view showing the display device.

FIG. 2 is a schematic view illustrating the configuration of the display device according to the first embodiment.

Figure 3:
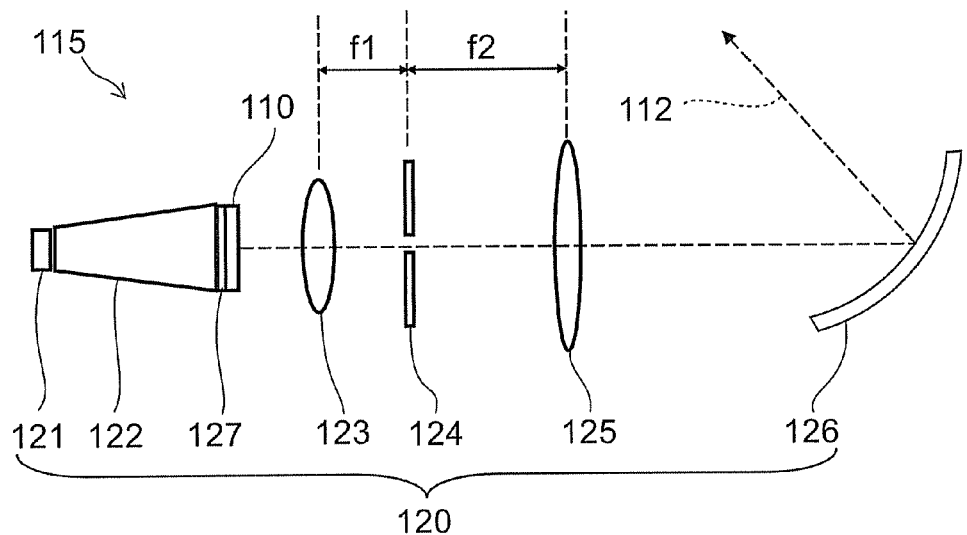
FIG. 3 is a schematic, view showing an image projection unit of the display device.

FIG. 3 is a schematic view illustrating the configuration of an image projection unit of the display device according to the first embodiment.

Figure 4:
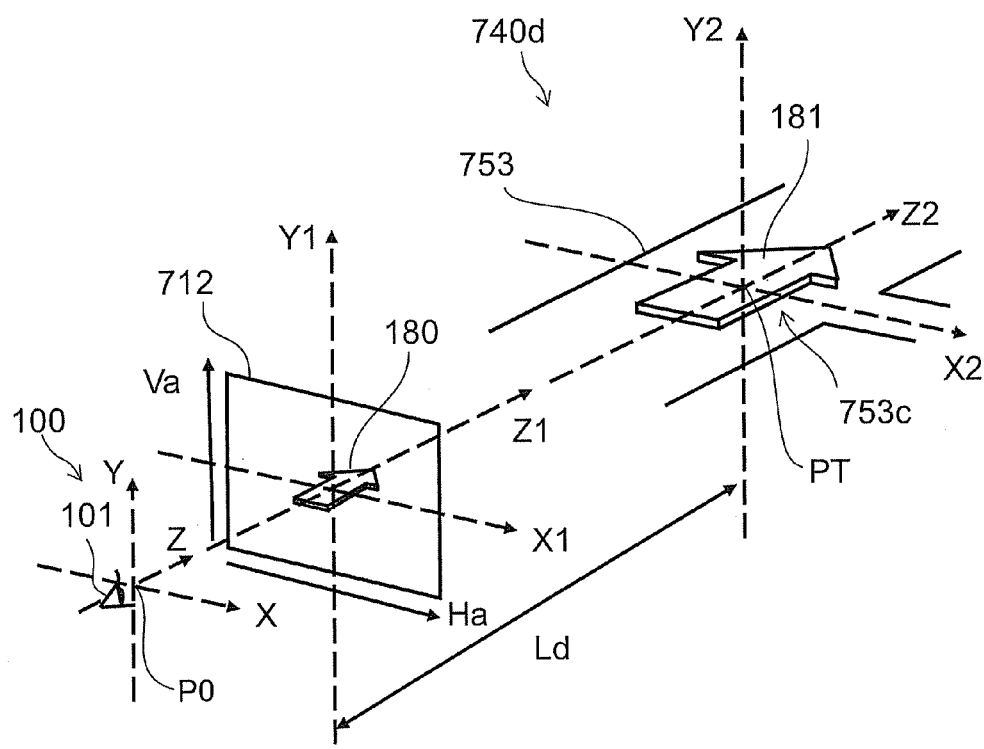
FIG. 4 is a schematic view showing a coordinate system of the display device.

FIG. 4 is a schematic view illustrating a coordinate system of the display device according to the first embodiment.

FIG. 5A to FIG. 5D are schematic views illustrating a display object of the display device according to the first embodiment.

First, the configuration of the display device 10 according to the embodiment will be described using FIG. 2 and FIG. 3. As shown in FIG. 2, the display device 10 includes an image projection unit 115 configured to project a light flux 112 that includes an image including a display object 180 toward one eye 101 of a human viewer 100 by using a reflective and transmissive projection plate 715 to reflect the light flux 112.

The display object 180 is provided in the image that the display device 10 presents to the human viewer 100 and is, for example, various display content relating to the operation information of a vehicle 730 (a moving body) in which the display device 10 is mounted such as an arrow indicating the travel direction, etc.

The projection plate 715 is, for example, a windshield 710 of the vehicle 730. The projection plate 715 may include a reflective and transmissive optical layer that is formed on the windshield 710. The projection plate 715 may include a reflective and transmissive optical component that is additionally provided proximally to the windshield 710. Thus, the projection plate 715 is the windshield unit of the vehicle 730 in which the display device 10 is mounted.

The image projection unit 115 projects the light flux 112 toward the head 105 of the human viewer 100. In other words, the light flux 112 emitted from the image projection unit 115 is reflected by a reflective surface 712 of the projection plate 715 and is incident on the one eye 101 of the human viewer 100.

The human viewer 100 can simultaneously view the external environment information of the vehicle 730 and the display object 180 of the image included in the projected light flux 112.

As illustrated in FIG. 2, the display device 10 is provided, for example, inside the vehicle 730, e.g., in an inner portion of a dashboard 720 of the vehicle 730 as viewed by the human viewer 100 who is the operator.

The image projection unit 115 includes, for example, an image data generation unit 130, an image formation unit 110, and a projection unit 120.

The image data generation unit 130 generates an image signal corresponding to the image including the display object and supplies the image signal to the image formation unit 110.

Various optical switches such as, for example, liquid crystal display devices (LCDs), DMD (Digital Micromirror Devices), MEMS (Micro-electro-mechanical Systems), etc., may be used as the image formation unit 110. The image formation unit 110 forms the image on the screen of the image formation unit 110 based on the image signal supplied from the image data generation unit 130.

On the other hand, the projection unit 120 may include, for example, various light sources, lenses, mirrors, and various optical elements configured to control the divergence angle (the diffusion angle).

In the specific example, the projection unit 120 includes a first lens 123, a second lens 125, and an aperture 124 (a divergence angle control unit) provided between the first lens 123 and the second lens 125. The size of the opening of the aperture 124 may be variable. That is, a variable aperture may be used as the aperture 124.

More specifically, as shown in FIG. 3, the projection unit 120 includes a light source 121, a tapered light guide 122, the first lens 123, the second lens 125, the aperture 124, and a mirror 126.

The first lens 123 is disposed between the light source 121 and the mirror 126; the second lens 125 is disposed between the first lens 123 and the mirror 126; and the tapered light guide 122 is disposed between the light source 121 and the first lens 123.

In the specific example, the image formation unit 110 (e.g., the LCD) is disposed between the tapered light guide 122 and the first lens 123.

For example, the aperture 124 is mounted at a position that is a distance f1 from the first lens 123 and a distance f2 from the second lens 125, where the distance f1 (the first focal distance) is the focal distance of the first lens 123 and the distance f2 (the second focal distance) is the focal distance of the second lens 125. In other words, the distance between the divergence angle control element and the first lens 123 is the first focal distance; and the distance between the divergence angle control element and the second lens 125 is the second focal distance.

The mirror 126 has, for example, a concave configuration. Thereby, the mirror 126 can project an enlarged image of the light flux 112 to the human viewer 100. The light source 121 may include various light sources such as LEDs (Light Emitting Diodes), high pressure mercury lamps, halogen lamps, lasers, etc.

By using an LED as the light source 121, the power consumption can be reduced; and the device can be lighter and smaller.

The divergence angle of the light emitted from the light source 121 is controlled to be within a certain range by the tapered light guide 122 such that the light emitted from the light source 121 becomes the light flux 112 that includes the image including the prescribed display object 180 in the image formation unit 110. The divergence angle of the light flux 112 is controlled to be a prescribed angle by passing through the first lens 123, the aperture 124, and the second lens.

In the specific example, a diffuser plate 127 is provided between the tapered light guide 122 and the image formation unit 110; and thereby, the light incident on the image formation unit 110 is more uniform.

As shown in FIG. 2, the light flux 112 reaches the one eye 101 of the human viewer 100 by being reflected by the projection plate 715 of the vehicle 730 after being reflected by the mirror 126.

At this time, for example, the light flux 112 is incident on the one eye 101 of the human viewer 100, and the light flux 112 is not incident on the other eye because a projection area 114 and a projection position 114a of the projection region of the light flux 112 are controlled by various optical elements included in the image projection unit 115. For example, the projection area 114 of the light flux 112 is controlled to be about 65 mm (millimeters) in the lateral direction (the lateral direction as viewed by the human viewer 100). For example, the lateral-direction width of the projection area 114 of the light flux 112 at the position of the human viewer 100 as viewed by the human viewer 100 is not more than 70 mm.

An aspherical Fresnel lens (not shown) may be provided on the emerging side of the mirror 126 (the side opposite to the light source). By such an aspherical Fresnel lens, for example, the configuration of the image included in the light flux 112 can be aligned by controlling the configuration of the light flux 112 to match the configuration of the windshield 710.

The mirror 126 may be movable; and, for example, the light flux 112 can be projected appropriately toward the one eye 101 by manually or automatically adjusting the position and/or the angle of the mirror 126 manually or automatically to match the position and/or the movement of the head 105 of the human viewer 100.

Other than the specific examples recited above, various modifications to the image projection unit 115 are possible.

The human viewer 100 perceives an image 181 of the display object 180 formed at the position of a virtual image formation position 181a via the projection plate 715. Thus, the display device 10 can be used as a HUD.

The display object 180 has a target, position that relates to the depth direction as viewed by the human viewer 100. The target position of the display object 180 will now be described.

Here, as viewed by the human viewer 100 as shown in FIG. 4, the depth direction is taken as a Z-axis direction; the lateral direction (a horizontal direction Ha) is taken as an X-axis direction; and the vertical direction (a perpendicular direction Va.) is taken as a Y-axis direction. The direction away from the human viewer 100 is taken as the positive direction of the Z-axis; the direction to the right of the human viewer 100 is taken as the positive direction of the X-axis; and the direction upward from the human viewer 100 is taken as the positive direction of the Y-axis.

The human viewer 100 views the display object 180 of the image of the light flux 112 reflected at the reflective surface 712 of the projection plate 715. At this time, in the case where the display object 180 is an arrow illustrating, for example, a route, the image 181 of the arrow of the display object 180 is disposed to overlap the position of a branch point 753c of a road 753 of a background image 740d. In other words, the depth-direction position of the branch point 753c of the background image 740d as viewed by the human viewer 100 is a target position PT where the display object 180 is to be disposed.

Thus, the display object 180 is disposed at the target position PT in the visual space of the human viewer 100 to correspond to the desired position in real space (the space having the X1-axis, the Y1-axis, and the Z1-axis). In other words, when displaying the display object 180 to correspond to any object (mountains, rivers, various buildings and display objects, roads, branch points, etc.) existing in real space, the display object 180 is disposed at the target position PT which is the position of the object as viewed by the human viewer 100. Hereinbelow, the case is described where an arrow illustrating the route is used as the display object 180.

Herein, the X-axis, the Y-axis, and the Z-axis of the position of the human viewer 100 in real space are parallel to the X2-axis, the Y2-axis, and the Z2-axis of the position of the background in real space, respectively. On the other hand, the X1-axis, the Y1-axis, and the Z1-axis of the reflective surface 712 may not be parallel to the X-axis, the Y-axis, and the Z-axis, respectively. In other words, as illustrated in FIG. 2, the reflective surface 712 of the projection plate 715 which is the windshield 710 of the vehicle 730 is tilted (rotated around the X1-axis) as viewed by the human viewer 100. For easier viewing of the drawing in FIG. 4, the X1-axis, the Y1-axis, and the Z1-axis are taken to be parallel to the X-axis, the Y-axis, and the Z-axis, respectively.

Herein, the position of the one eye 101 of the human viewer 100 is taken as a reference point P0. The reference point P0 is different from the target position PT in the directions of each of the X-axis, the Y-axis, and the Z-axis in real space. In practice, because of the circumstances in which the display device 10 is mounted and used in the vehicle 730, the differences in the vertical direction (the Y-axis direction) and the lateral direction (the X-axis direction) are small; and the difference in the depth direction (the Z-axis direction) is large. Therefore, the depth direction (the Z-axis direction) distance between the target position PT and the position of the one eye 101 of the human viewer 100 (the reference point P0) in particular is taken as a depthward set distance Ld.

The display object 180 is disposed at, for example, the position of the branch point 753c as the target position PT. It is not always necessary for the target position PT to be set at the branch point 753c; and the target position PT may be set at any position. For example, the display object 180 may be disposed at a frontward position (the target position PT) at a prescribed distance as viewed by the human viewer 100 even in the case where an arrow heading straight is used as the display object 180. The prescribed distance recited above is set based on the movement speed of the vehicle 730, the circumstances of the frontward road, etc.

A specific example of the disposition of the display object 180 will now be described.

Figure 5A:
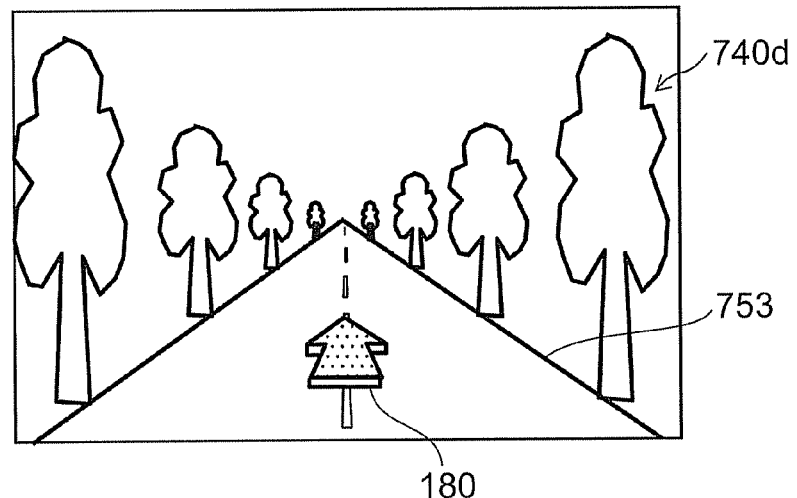
FIG. 5A to FIG. 5D are schematic views showing a display object of the display device.
Figure 5B:
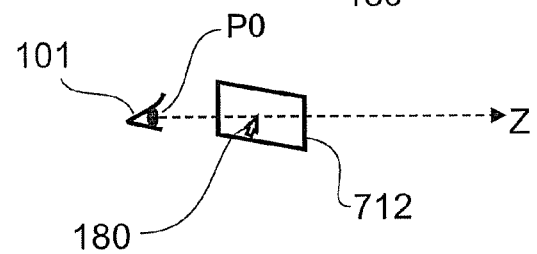
Figure 5C:
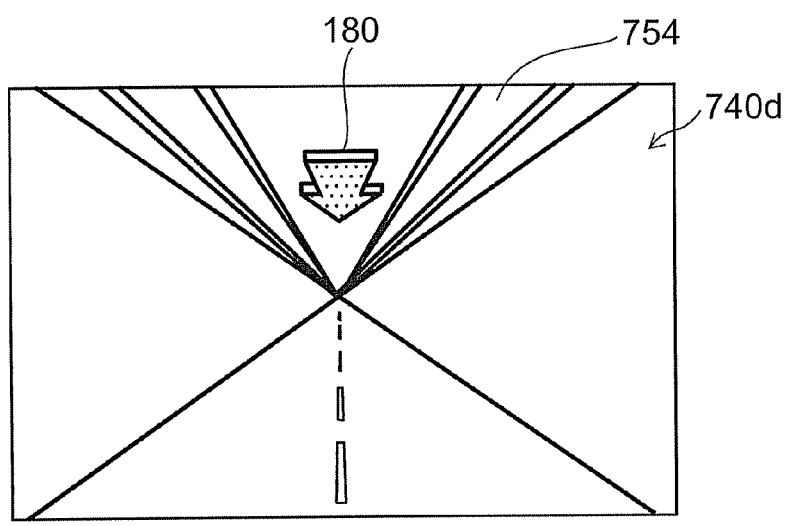
Figure 5D:
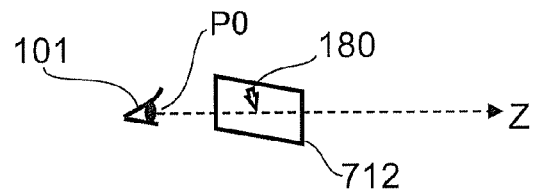

FIGS. 5A and 5B illustrate the case where the display object 180 is displayed to correspond to the road 753 (the ground surface) of the background image 740d; and FIGS. 5C and 5D illustrate the case where the display object 180 is displayed to correspond to a ceiling 754 (the sky) of the background image 740d.

As shown in FIG. 5B, in the case where the position of the display object 180 of the reflective surface 712 is positioned lower than the one eye 101 of the human viewer 100 as viewed from the one eye 101 of the human viewer 100, the human viewer 100 views the display object 180 as being superimposed on an object of the background image 740d that is lower than the line of sight. For example, the road 753 is used as the object of the background image 740d that is lower than the line of sight.

In such a case, as shown in FIG. 5A, the display object 180 is displayed to correspond to the road 753 of the background image 740d.

As shown in FIG. 5D, the human viewer 100 views the display object 180 as being superimposed on an object of the background image 740d that is higher than the line of sight in the case where the position of the display object 180 of the reflective surface 712 is positioned higher than the one eye 101 of the human viewer 100 as viewed from the one eye 101 of the human viewer 100. For example, the ceiling 754 is used as the object of the background image 740d that is higher than the line of sight.

In such a case, as shown in FIG. 5C, the display object 180 is displayed to correspond to the ceiling 754 of the background image 740d.

Three-dimensionally overlapping roads such as elevated roads and the like, roads of tunnels and the like, and illumination, power lines, and the like that are mounted overhead in the sky may be used as such an object that is higher than the line of sight. In such a case, for example, the reflective surface 712 is disposed on the roof side of the vehicle 730; and the display object 180 is viewed by the human viewer 100 as being higher than the Z-axis direction.

Operations of the display device 10 according to the embodiment will now be described for the case where the display object 180 is displayed to correspond to the road 753 (the ground surface) of the background image 740d.

FIG. 1A schematically illustrates the image 181 of the display object 180 and the background image 740d of the external environment of the vehicle 730 that are perceived by the human viewer 100. FIG. 1B illustrates the image 181 of the display object 180 of a screen 110d of the image formation unit 110 of the image projection unit 115. FIG. 1C illustrates the background image 740d of the external environment of the vehicle 730 that is perceived by the human viewer 100.

As shown in FIG. 1B, the display object 180 is formed in the screen 110d of the image formation unit 110 (e.g., the LCD). The display object 180 has an arrow configuration.

The display object 180 has a vanishing point VP1 (a first vanishing point VP1).

In other words, the display object 180 has a configuration including the vanishing point VP1 that causes a perception of depth; and, for example, the extension lines of two sides 183a and 183b of the shaft portion of the arrow intersect at the vanishing point VP1. In other words, the display object 180 has a configuration that includes a first side (the side 183a) and a second side (the side 183b); and the extension line of the first side and the extension line of the second side intersect at the vanishing point VP1 of the display object 180.

In the case where the display object 180 is disposed lower than the human viewer 100 as viewed by the human viewer 100 (e.g., the case of the configuration illustrated in FIGS. 5A and 5B), the vanishing point VP1 is disposed higher than the position of the display object 180.

On the other hand, in the case where the display object 180 is disposed higher than the human viewer 100 as viewed by the human viewer 100 (e.g., the case of the configuration illustrated in FIGS. 5C and 5D), the vanishing point VP1 is disposed lower than the position of the display object 180.

The human viewer 100 gets a sense of depth of the display object 180 as viewed by the human viewer 100 based on the positional relationship between the vanishing point VP1 and the display object 180. Thus, it is easier for the human viewer 100 to infer the depthward position of the display object 180 by the display object 180 having the vanishing point VP1.

For example, when the display object 180 is disposed at a position lower than a position of a center of the reflective surface 712 of the projection plate 715 as viewed by the human viewer 100, the vanishing point VP1 of the display object 180 is disposed at a position higher than a position of the vanishing point VP2 of the background image 740d as viewed by the human viewer 100.

On the other hand, as shown in FIG. 1C, the background image 740d of the external environment of the vehicle 730 has a vanishing point VP2 (the second vanishing point VP2). In the specific example, the road 753 extending straight frontward as viewed by the human viewer 100 exists; and the extension lines of boundaries 753a and 753b on the two sides of the road 753 substantially intersect (become a point) at the vanishing point VP2. Thus, the human viewer 100 gets a sense of depth of the background image 740d because the background image 740d has the vanishing point VP2.

For example, when the display object 180 is disposed at a position higher than a position of a center of the reflective surface 712 of the projection plate 715 as viewed by the human viewer 100, the vanishing point VP1 of the display object 180 is disposed at a position lower than a position of the vanishing point VP2 of the background image 740d as viewed by the human viewer 100.

In the display device 10 according to the embodiment as shown in FIG. 1A, the vanishing point VP1 of the display object 180 is disposed at a position different from that of the vanishing point VP2 of the background image 740d.

More specifically, the vanishing point VP1 of the display object 180 is disposed higher than the vanishing point VP2 of the background image 740d. In other words, the vanishing point VP1 of the display object 180 is disposed higher than the vanishing point VP2 of the background image 740d in the case where the human viewer 100 simultaneously views the image 181 of the display object 180 and the background image 740d.

In other words, as viewed by the human viewer 100, the image projection unit 115 disposes the vanishing point VP1 of the display object 180 higher than the vanishing point VP2 of the background image 740d that the human viewer 100 views through the projection plate 715.

Generally, when making images including pictures and the like, a vanishing point is used when disposing various objects at depthward positions inside the image. For example, the objects are perceived as being fixed at the prescribed depthward positions by drawing imaginary straight lines radially from the prescribed vanishing point and by causing the outlines and the like of the objects to follow the straight lines. Although vanishing points can be multiply provided, the case is described herein where one vanishing point is provided inside one image to simplify the description.

Thus, in the formation of a general image, the display object 180 is generated such that the position of the vanishing point VP1 of the display object 180 matches the position of the vanishing point VP2 of the background image 740d even in the case of a HUD because the display object is generated such that the extension lines of the boundary lines that form the outlines of the display objects intersect at the vanishing point; but in the embodiment, the display object 180 is generated such that the position of the vanishing point VP1 of the display object 180 is different from the position of the vanishing point VP2 of the background image 740d. The vanishing point VP2 of the background image 740d is inferred from the tilt of the display device 10 and the projection position 114a.

Thereby, the depthward set position of the display object 180 can match the perceived depthward position of the display object with good precision.

The configuration of the embodiment was constructed based on human perception characteristics that were newly discovered by the experimental results relating to depth perception described below.

The inventor mounted the display device 10 in the vehicle 730; and a participant (the human viewer 100) riding in the passenger seat of the vehicle 730 viewed the images 181 of various display objects 180 (arrows) by using the windshield 710 of the vehicle 730 to reflect the images 181 while the vehicle 730 traveled. Then, an experiment was performed by disposing the display object 180 at various depthward positions, by changing the size of the display object 180 and the height from the ground surface, and by having the participant respond regarding the depth distance perceived at that time.

Figure 6:
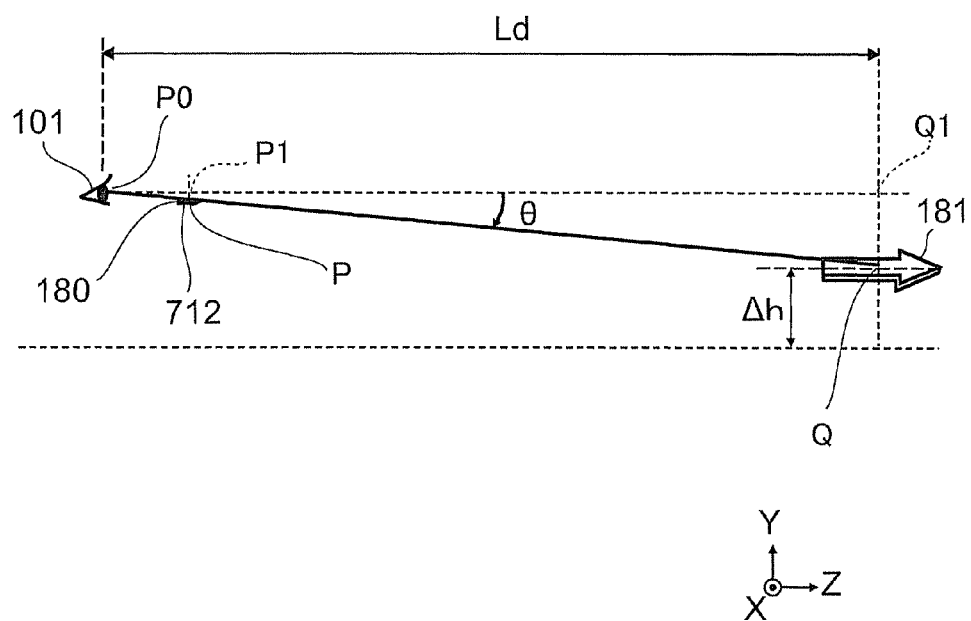
FIG. 6 is a schematic view showing the configuration of the evaluation experiment of the characteristics of the display device.

FIG. 6 is a schematic view illustrating the configuration of the evaluation experiment of the characteristics of the display device according to the first embodiment.

As shown in FIG. 6, the position of the one eye 101 of the participant (the human viewer 100) is taken as the reference point P0; and the depth direction (the Z-axis direction) distance from the reference point P0 to a set arrangement position Q of the display object 180 is taken as the depthward set distance Ld. In other words, the set arrangement position Q is the target position PT of the display object. In this experiment, the three types of depthward set distances Ld of 30 m, 45 m, and 60 m were used.

The distance between the set arrangement position Q of the display object 180 and the ground surface is taken as a set height $\Delta h$. In this experiment, the three types of set heights $\Delta h$ of 0 m, 0.5 m, and 1.0 m were used.

The three types of sizes of the display object 180 when disposed at the positions corresponding to depthward set distances Ld of 30 m, 45 m, and 60 m, respectively, were used. In other words, three types of set dimension distances Sr of 30 m, 45 m, and 60 m corresponding to the sizes of the display objects 180 were used. The set dimension distance Sr is the size of the display object 180 expressed as the depth distance and is based on the phenomenon of the sense of perspective in which objects look smaller as the depthward position increases.

The plane parallel to the ground surface is the X-Z plane. The angle between the Z-axis direction and the line connecting the reference point P0 to the set arrangement position Q of the display object 180 is taken as a depression angle $\theta$. For the depression angle θ, downward (the direction toward the ground surface) as viewed from the one eye 101 of the human viewer 100 is positive.

FIG. 7A to FIG. 7D, FIG. 8A to FIG. 8D, and FIG. 9A to FIG. 9D are schematic views illustrating the conditions of the evaluation experiment of the characteristics of the display device according to the first embodiment.

Figure 7A:
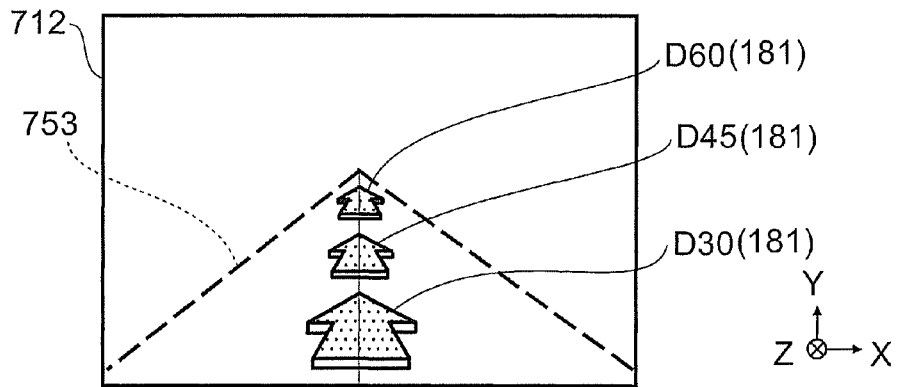
FIG. 7A to FIG. 7D are schematic views showing the conditions of the evaluation experiment of the display device.

Namely, FIGS. 7A to 7D illustrate the change of the depthward set distance Ld; FIGS. 8A to 8D illustrate the change of the set height Δh; and FIGS. 9A to 9D illustrate the change of the set dimension distance Sr. FIG. 7A, FIG. 8A, and FIG. 9A illustrate the change of the image 181 of the display object 180 when changing the depthward set distance Ld, the set height Δh, and the set dimension distance Sr, respectively. FIGS. 7B to 7D, FIGS. 8B to 8D, and FIGS. 9B to 9D illustrate the position and the size of the image 181 of the display object 180 for each of the changes.

Figure 7B:
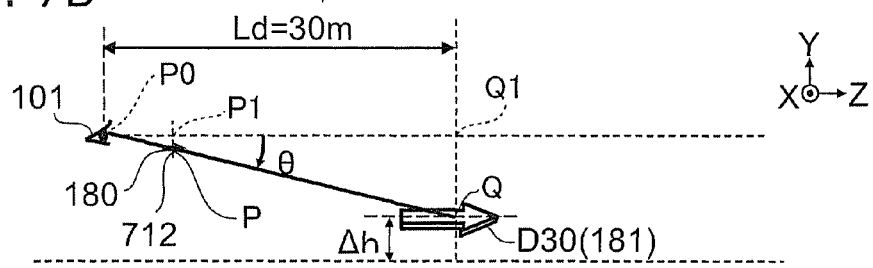
Figure 7C:
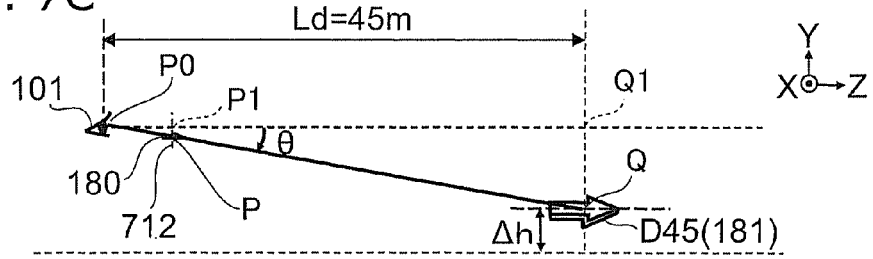
Figure 7D:
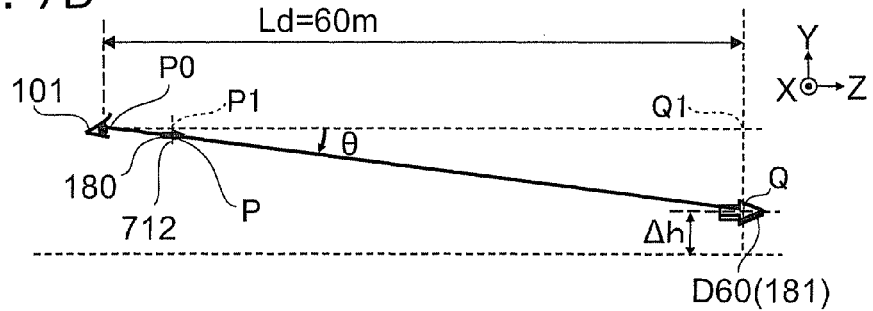
Figure 8A:
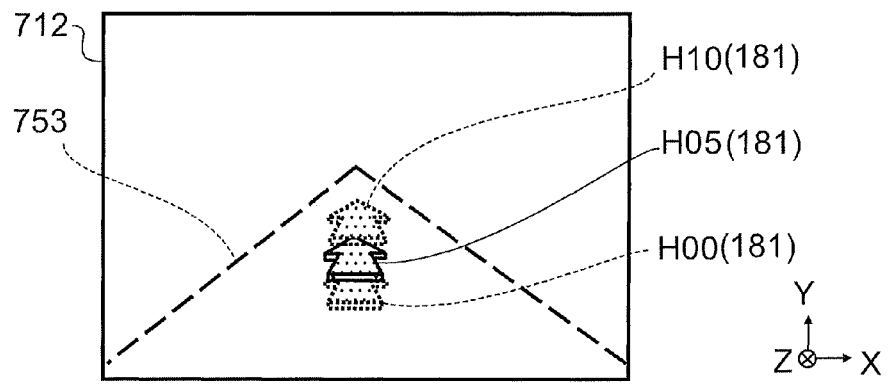
FIG. 8A to FIG. 8D are schematic views showing the conditions of the evaluation experiment of the display device.

As shown in FIGS. 7B to 7D, the depthward set distance Ld is changed to be 30 m, 45 m, and 60 m.

In such a case, as shown in FIG. 7A, the image 181 of the display object 180 is changed to be an image D30, an image D45, and an image D60. In other words, the position of the image 181 moves in the upward Y-axis direction (the positive direction of the Y-axis) and the size of the image 181 decreases as the depthward set distance Ld increases.

As illustrated in FIGS. 7B to 7D, the position of the image 181 at this time changes based on the proportions of the mutual distances of the reference point P0 which is the position of the one eye 101 of the human viewer 100, the set arrangement position Q of the display object 180, and a projection position P at the reflective surface 712 where the light flux 112 is projected. In other words, the position of the image 181 changes based on the proportion of the triangle having the vertexes of the reference point P0, the set arrangement position Q, and a set horizontal arrangement position Q1 and the triangle having the vertexes of the reference point P0, the projection position P, and a horizontal projection position P1. In the specific example, the position of the image 181 of the display object 180 inside the screen 110d is caused to shift in the upward direction to correspond to the shift of the projection position P in the upward direction as the depthward set distance Ld increases.

Figure 8B:
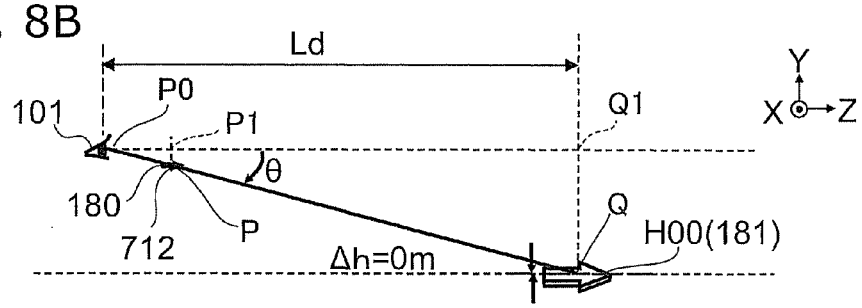
Figure 8C:
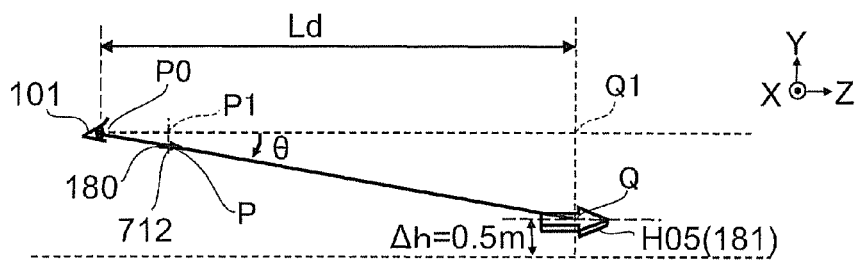
Figure 8D:
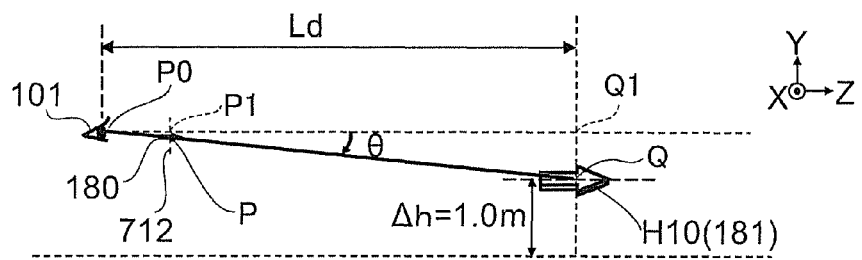
Figure 9A:
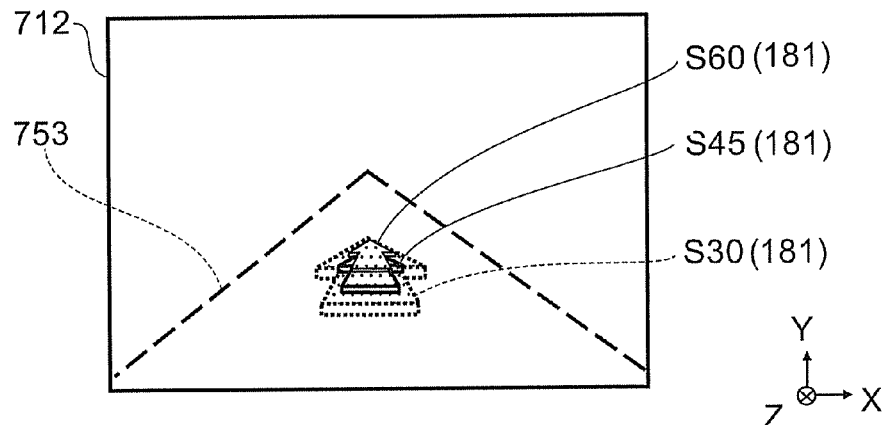
FIG. 9A to FIG. 9D are schematic views showing the conditions of the evaluation experiment of the display device.

As shown in FIGS. 8B to 8D, the set height Δh is changed to be 0 m, 0.5 m, and 1.0 m.

In such a case, as shown in FIG. 8A, the image 181 of the display object 180 changes to be an image H00, an image H05, and an image H10. In other words, the position of the image 181 moves in the upward Y-axis direction (the positive direction of the Y-axis) as the set height Δh increases.

In such a case as well, the position of the image 181 changes based on the proportion of the triangle having the vertexes of the reference point P0, the set arrangement position Q, and the set horizontal arrangement position Q1 and the triangle having the vertexes of the reference point P0, the projection position P, and the horizontal projection position P1 recited above. In the specific example, the position of the image 181 of the display object 180 inside the image is caused to shift in the upward direction to correspond to the shift of the projection position P in the upward direction as the set height Δh increases. Because the depression angle θ also changes as the set height Δh changes, the configuration of the image 181 of the display object 180 also changes in conjunction with the change of the depression angle θ.

Figure 9B:
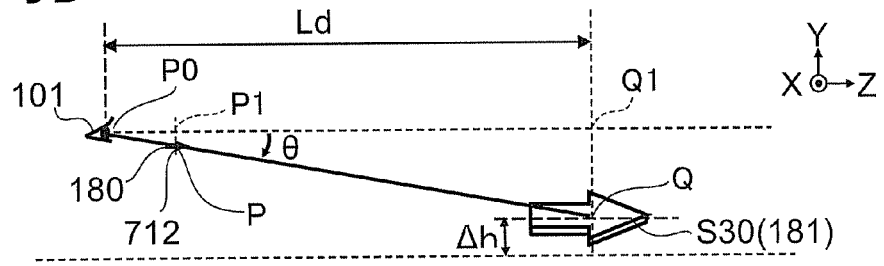
Figure 9C:
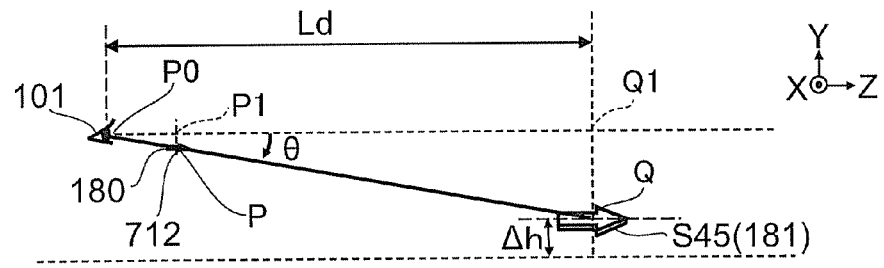
Figure 9D:
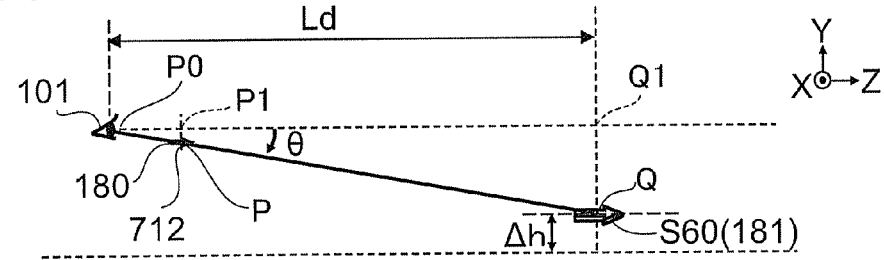

As shown in FIGS. 9B to 9D, the set dimension distance Sr is changed to be 30 m, 45 m, and 60 m.

At this time, as shown in FIG. 9A, the image 181 of the display object 180 is changed to be an image S30, an image S45, and an image S60. In other words, the size of the image 181 decreases as the set dimension distance Sr increases. This change of the size of the image 181 is based on the sense of perspective.

The position of the image 181 set based on the proportion of the triangle having the vertexes of the reference point P0, the set arrangement position Q, and the set horizontal arrangement position Q1 and the triangle having the vertexes of the reference point P0, the projection position P, and the horizontal projection position P1 recited above will be called the analogous set position.

FIG. 7A to FIG. 9D recited above are examples in which the depthward set distance Ld, the set height Δh, and the set dimension distance Sr are changed independently; but in this experiment, the depth distance (a perceived depth distance Ls) perceived using the display object 180 was determined for a total of 27 types of conditions by using three types for each of the depthward set distance Ld, the set height Δh, and the set dimension distance Sr.

FIG. 10A to FIG. 10D, FIG. 11A to FIG. 11D, and FIG. 12A to FIG. 12D are graphs illustrating the experimental results of the characteristics of the display device according to the first embodiment.

Namely, FIGS. 10A to 10D are the results when the depthward set distance Ld was 30 m; FIGS. 11A to 11D are the results when the depthward set distance Ld was 45 m; and FIGS. 12A to 12D are the results when the depthward set distance Ld was 60 m.

Figure 10A:
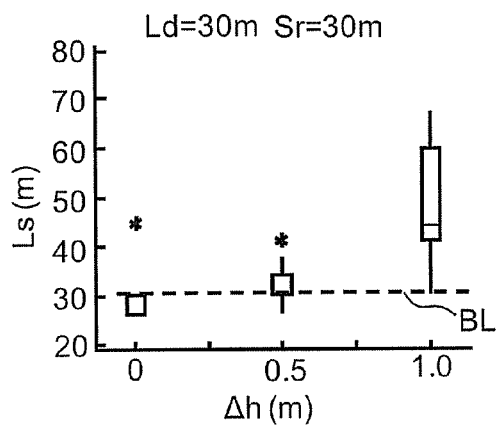
FIG. 10A to FIG. 10D are graphs showing the experimental results of the display device.
Figure 10B:
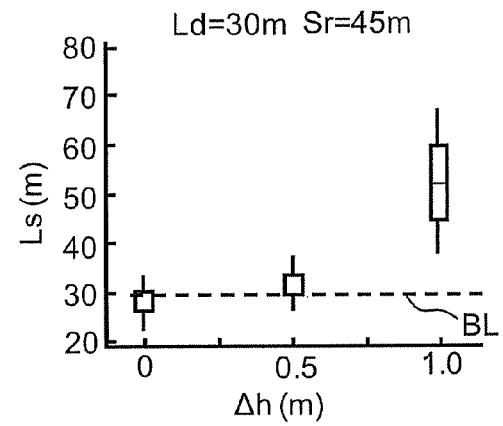
Figure 10C:
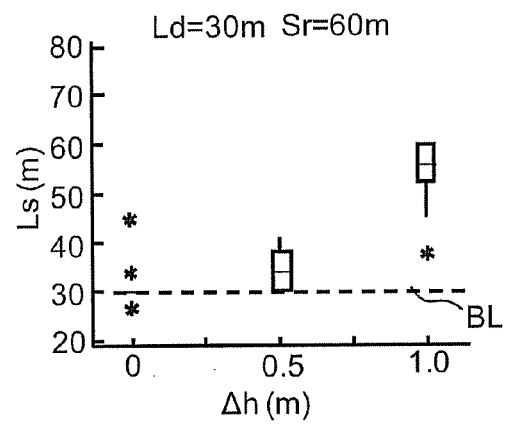
Figure 10D:
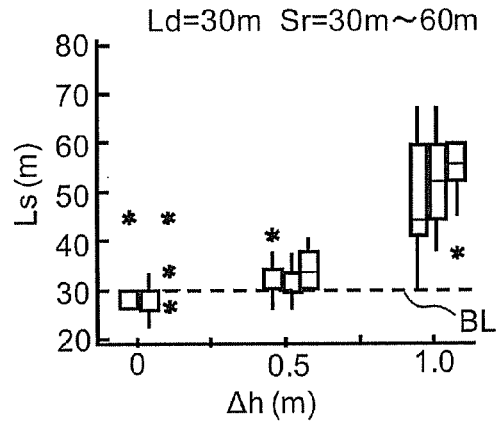
Figure 11A:
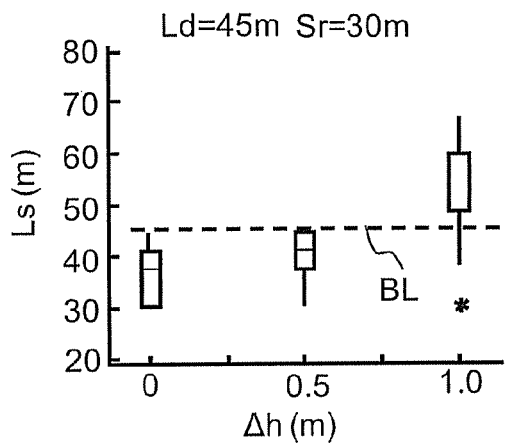
FIG. 11A to FIG. 11D are graphs showing the experimental results of the display device.
Figure 11B:
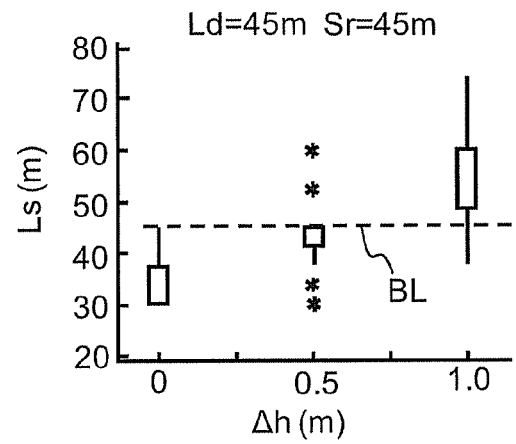
Figure 11C:
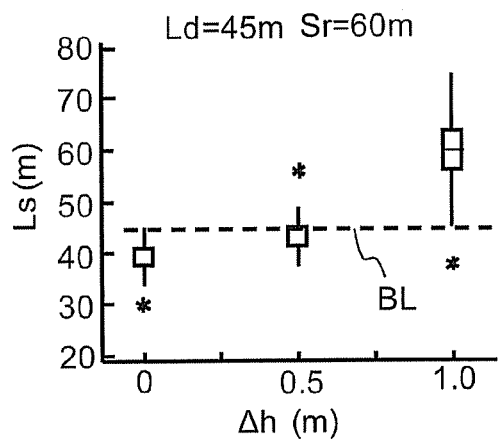
Figure 11D:
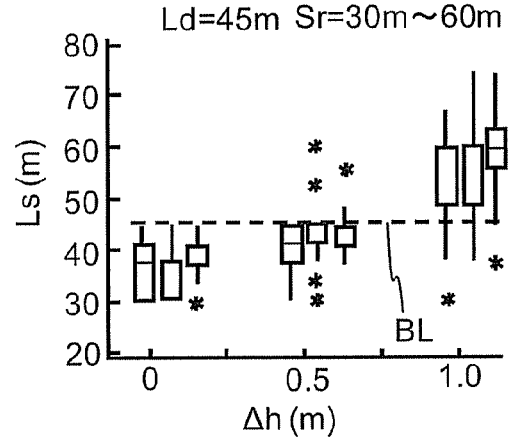
Figure 12A:
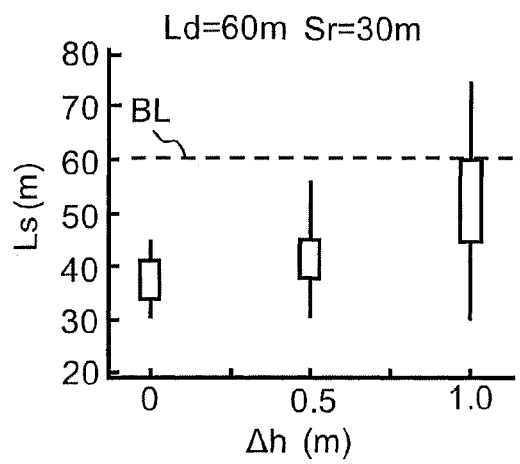
FIG. 12A to FIG. 12D are graphs showing the experimental results of the display device.
Figure 12B:
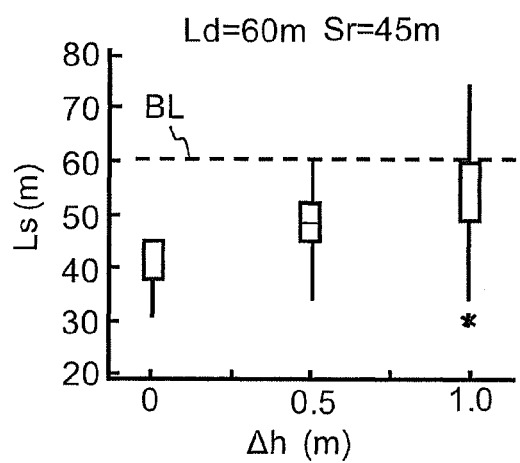
Figure 12C:
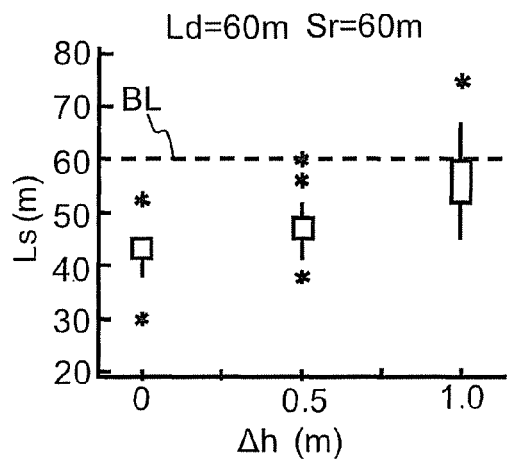
Figure 12D:
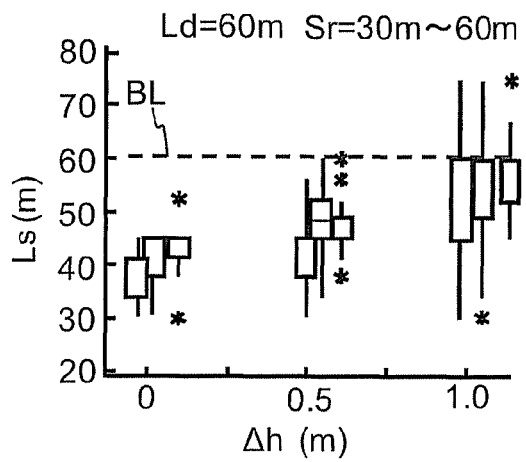

FIG. 10A, FIG. 11A, and FIG. 12A are the results when the set dimension distance Sr was 30 m; FIG. 10B, FIG. 11B, and FIG. 12B are the results when the set dimension distance Sr was 45 m; and FIG. 10C, FIG. 11C, and FIG. 12C are the results when the set dimension distance Sr was 60 m. FIG. 10D, FIG. 11D, and FIG. 12D illustrate the combined results when the set dimension distance Sr was 30 m, 45 m, and 60 m.

In these drawings, the horizontal axis is the set height Δh; and the vertical axis is the perceived depth distance Ls. In each of the drawings, the broken line BL shows the perceived depth distance Ls that matches the depthward set distance Ld for that drawing.

FIG. 13A to FIG. 13C are graphs illustrating the experimental results of the characteristics of the display device according to the first embodiment.

Namely, FIGS. 13A to 13C are other graphs illustrating the results of portions of FIG. 10A to FIG. 12D. These are graphs illustrating the results of FIG. 10A, FIG. 11B, and FIG. 12C for which the depthward set distance Ld matches the set dimension distance Sr, where the horizontal axis is the depthward set distance Ld and the vertical axis is the perceived depth distance Ls. FIGS. 13A to 13C are the results when the set height Δh is 0 m, 0.5 m, and 1.0 m, respectively. In these drawings, the broken line BL shows the case where the depthward set distance Ld matches the perceived depth distance Ls.

FIG. 10A to FIG. 13C are box plots in which the lower end of the box (the rectangle) is the first quartile; the upper end of the box is the third quartile; the horizontal line inside the box shows the median; the upper end of the vertical line is the maximum value; the lower end of the vertical line is the minimum value; and the "*" marks are outliers.

When the depthward set distance Ld is 30 m as shown in FIGS. 10A to 10D, the perceived depth distance Ls approaches 30 m when the set height Δh is 0 m.

When the depthward set distance Ld is 45 m as shown in FIGS. 11A to 11D, the perceived depth distance Ls approaches 45 m when the set height Δh is 0.5 m.

When the depthward set distance Ld is 60 m as shown in FIGS. 12A to 12D, the perceived depth distance Ls approaches 60 m when the set height Δh is about 1.0 m.

When the depthward set distance Ld is small (e.g., 30 m) as shown in FIGS. 13A to 13C, the depthward set distance Ld and the perceived depth distance Ls approach each other when the set height Δh is 0 m. As the depthward set distance Ld increases to 45 m and 60 m, the depthward set distance Ld and the perceived depth distance Ls approach each other for a larger set height Δh.

Thus, as the depthward set distance Ld increases to 30 m, 45 m, and 60 m and as the set arrangement position Q of the display object 180 becomes distal to the human viewer 100 as viewed by the human viewer 100, the correspondence between the depthward set distance Ld and the perceived depth distance Ls increases when the height of the disposition of the display object 180 is shifted upward from the ground surface.

The display object 180 is an arrow; and normally, the display object 180 is disposed to match the height of the surface of the road 753 which is the background image 740*d* (i.e., the set height Δh is set to be 0 m).

Thus, when the set height Δh is set to be 0 m, the depthward set distance Ld and the perceived depth distance Ls are relatively matched when the depthward set distance Ld is 30 m; but the depthward set distance Ld and the perceived depth distance Ls no longer match as the depthward set distance Ld exceeds 30 m. It is not conventionally known that the set height Δh at which the depthward set distance Ld and the perceived depth distance Ls match thus changes as the depthward set distance Ld changes in a monocular display. Further, it is not conventionally known that the set height Δh at which the depthward set distance Ld and the perceived depth distance Ls match increases as the depthward set distance Ld increases. Such a phenomenon was discovered for the first time by this experiment.

This experimental result means that disposing the image 181 of the display object 180 to be shifted higher in the image (in this case, toward the center of the image) than the analogous set position in the image improves the correspondence between the depthward set distance Ld and the perceived depth distance Ls as the depthward set distance Ld increases.

Also, considering that the display object 180 is disposed on the road 753 side as viewed by the human viewer 100 (the lower side, i.e., the negative-direction side of the Y-axis) in this experiment, the disposition of the image 181 of the display object 180 to be shifted upward in the image corresponds to disposing the image 181 of the display object 180 further from the human viewer 100 as viewed by the human viewer 100.

Accordingly, the correspondence between the depthward set distance Ld and the perceived depth distance Ls improves by disposing the image 181 of the display object 180 further from the human viewer 100 as viewed by the human viewer 100 as the depthward set distance Ld increases.

It is conceivable that this phenomenon is a peculiar characteristic relating to human depth perception when the human views a display with one eye. Because experimental conditions close to actual conditions were used to display the images 181 of various display objects 180 (arrows) particularly while causing the vehicle 730 to travel in this experiment, a display having a high correspondence between the depthward set distance Ld and the perceived depth distance Ls can be realized particularly for actual conditions such as when traveling, etc., by employing a configuration in which these results are applied.

In this experiment as illustrated in FIGS. 5A and 5B, the image 181 of the display object 180 being disposed further from the human viewer 100 as viewed by the human viewer 100 corresponds to the display object 180 being disposed higher because the display object 180 is disposed lower than the human viewer 100 as viewed by the human viewer 100.

On the other hand, as illustrated in FIGS. 5C and 5D, in the case where the display object 180 is disposed higher than the human viewer 100 as viewed by the human viewer 100, disposing the image 181 of the display object 180 further from the human viewer 100 as viewed by the human viewer 100 corresponds to disposing the display object 180 lower.

In other words, in the case where the depthward set distance Ld is large, the image 181 of the display object 180 may be disposed to be more distal than is the position that is based on the analogous set position. In the case where the display object 180 is disposed lower than the human viewer 100 as viewed by the human viewer 100, the display object 180 is disposed higher than the position that is based on the analogous set position. In the case where the display object 180 is disposed higher than the human viewer 100 as viewed by the human viewer 100, the display object 180 is disposed lower than the position that is based on the analogous set position.

Then, based on such new knowledge relating to this peculiar characteristic relating to human depth perception, in the display device 10 according to the embodiment, the vanishing point VP1 of the display object 180 is disposed to be more distal to the human viewer 100 as viewed by the human viewer 100 than is the vanishing point VP2 of the background image 740*d* that the human viewer 100 views through the projection plate 715.

In other words, the vanishing point VP1 of the display object 180 is disposed at a position different from that of the vanishing point VP2 of the background image 740*d*.

For example, the vanishing point VP1 of the display object 180 is disposed higher than the vanishing point VP2 of the background image 740*d* in the case where the display object 180 is disposed lower than the human viewer 100 as viewed by the human viewer 100.

For example, the vanishing point VP1 of the display object 180 is disposed lower than the vanishing point VP2 of the background image 740*d* in the case where the display object 180 is disposed higher than the human viewer 100 as viewed by the human viewer 100.

Thereby, the perception of the depthward position of the display object 180 can be provided to match the position of the background image 740*d* with good precision by conforming to human depth perception. Then, the display object 180 can be perceived to be at the desired depthward position by reducing the fluctuation due to the human viewer of the perceived depthward position.

The control of the vanishing point VP1 of the display object 180 will now be described in more detail.

FIG. 14A to FIG. 14D are schematic views illustrating operations of the display device according to the first embodiment.

Figure 14A:
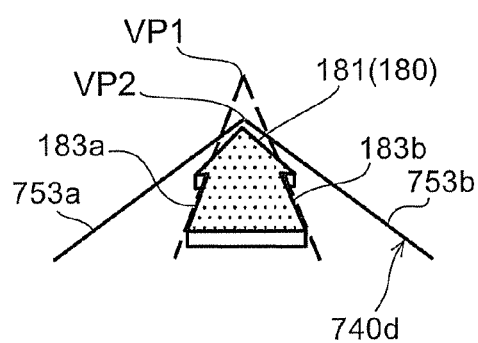
FIG. 14A to FIG. 14D are schematic views showing operations of the display device.
Figure 14B:
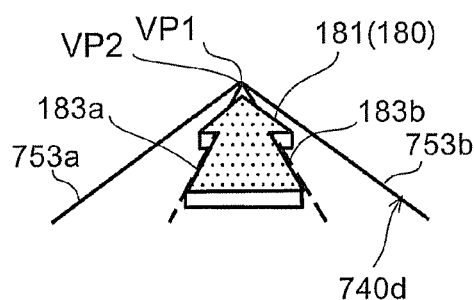

Namely, FIGS. 14A and 14B correspond to the case where the display object 180 is disposed lower than the human viewer 100 as viewed by the human viewer 100. On the other hand, FIGS. 14C and 14D correspond to the case where the display object 180 is disposed higher than the human viewer 100 as viewed by the human viewer 100.

Figure 14C:
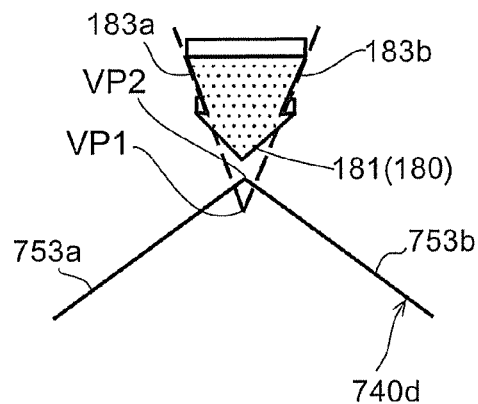
Figure 14D:
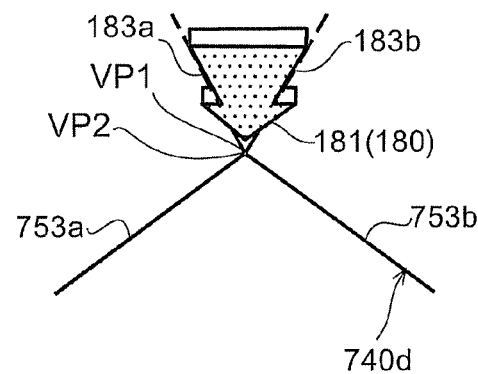

FIGS. 14A and 14C show states in which the depthward position indicated by the display object 180 is disposed to be more distal than is the background image 740*d*. FIGS. 14B and 14D show states in which the position indicated by the display object 180 is disposed at the same depthward position as the background image 740d. In these drawings, model-like illustrations of the boundaries 753a and 753b on two sides of the road 753 are provided as the background image 740d.

First, the case where the display object 180 is disposed lower than the human viewer 100 as viewed by the human viewer 100 will be described.

As shown in FIG. 14A, the vanishing point VP1 of the display object 180 is disposed higher than the vanishing point VP2 of the background image 740d as viewed by the human viewer 100. Thereby, the depthward position indicated by the display object 180 is disposed to be more distal than is the background image 740d. By using such a display object 180, for example, the perceived depth distance Ls and the depthward set distance Ld that are perceived by the human viewer 100 become well-matched in the case where the set arrangement position Q is relatively distal when the depthward set distance Ld is 45 m to 60 m as illustrated in FIG. 11A to FIG. 12D.

As shown in FIG. 14B, the vanishing point VP1 of the display object 180 matches the vanishing point VP2 of the background image 740d. In this case, the depthward position indicated by the display object 180 matches the depthward position of the background image 740d. By using such a display object 180, the perceived depth distance Ls and the depthward set distance Ld that are perceived by the human viewer 100 are well-matched in the case where, for example, the set arrangement position Q is relatively proximal when the depthward set distance Ld is 30 m as illustrated in FIGS. 10A to 10D.

The case where the display object 180 is disposed higher than the human viewer 100 as viewed by the human viewer 100 will now be described.

As shown in FIG. 14C, the vanishing point VP1 of the display object 180 is disposed lower than the vanishing point VP2 of the background image 740d as viewed by the human viewer 100. Thereby, the depthward position indicated by the display object 180 is disposed to be more distal than is the background image 740d. By using such a display object 180, the perceived depth distance Ls and the depthward set distance Ld that are perceived by the human viewer 100 become well-matched in the case where, for example, the set arrangement position Q is relatively distal when the depthward set distance Ld is 45 m to 60 m as illustrated in FIG. 11A to FIG. 12D.

As shown in FIG. 14D, the vanishing point VP1 of the display object 180 matches the vanishing point VP2 of the background image 740d. In this case, the depthward position indicated by the display object 180 matches the depthward position of the background image 740d. By using such a display object 180, the perceived depth distance Ls and the depthward set distance Ld that are perceived by the human viewer 100 are well-matched in the case where, for example, the set arrangement position Q is relatively proximal when the depthward set distance Ld is 30 m as illustrated in FIGS. 10A to 10D.

Thus, the image projection unit 115 disposes the display object 180 lower than the human viewer 100 as viewed by the human viewer 100 and disposes the vanishing point VP1 of the display object 180 higher as viewed by the human viewer 100 than the vanishing point VP2 of the background image 740d viewed by the human viewer 100 through the projection plate. Or, the image projection unit 115 disposes the display object 180 higher than the human viewer 100 as viewed by the human viewer 100 and disposes the vanishing point VP1 of the display object 180 lower than the vanishing point VP2 of the background image 740d as viewed by the human viewer 100.

More specifically, the image projection unit 115 causes the difference between the vanishing point VP1 of the display object 180 and the vanishing point VP2 of the background image 740d to change based on the target position PT at which the display object 180 is disposed (the position at the depthward set distance Ld as viewed by the human viewer 100).

In other words, for example, the position of the vanishing point VP1 of the display object 180 is caused to match the position of the vanishing point VP2 of the background image 740d by, for example, reducing the difference between the vanishing point VP1 of the display object 180 and the vanishing point VP2 of the background image 740d when the depthward set distance Ld is not more than about 30 m.

Then, for example, the position of the vanishing point VP1 of the display object 180 is caused to be different from the position of the vanishing point VP2 of the background image 740d by increasing the difference between the vanishing point VP1 of the display object 180 and the vanishing point VP2 of the background image 740d when the depthward set distance Ld is greater than about 30 m, e.g., not less than 45 m.

Thereby, the depthward set position of the display object can match the perceived depthward position of the display object with good precision by corresponding to human depth perception characteristics when the depthward set distance Ld is changed as described in regard to FIG. 10A to FIG. 13C.

In other words, the display object 180 can be perceived with good precision at the desired depthward position by reducing individual differences of the perceived depthward positions when the display object 180 is viewed; and it is possible to realize a high-precision depthward disposition using a background superimposition-type monocular display.

As recited above, it is desirable for the difference between the vanishing point VP1 of the display object 180 and the vanishing point VP2 of the background image 740d to be greater when the depthward set distance Ld is large than when the depthward set distance Ld is small. Thereby, the precision of the perceived depthward position is even higher.

Figure 15A:
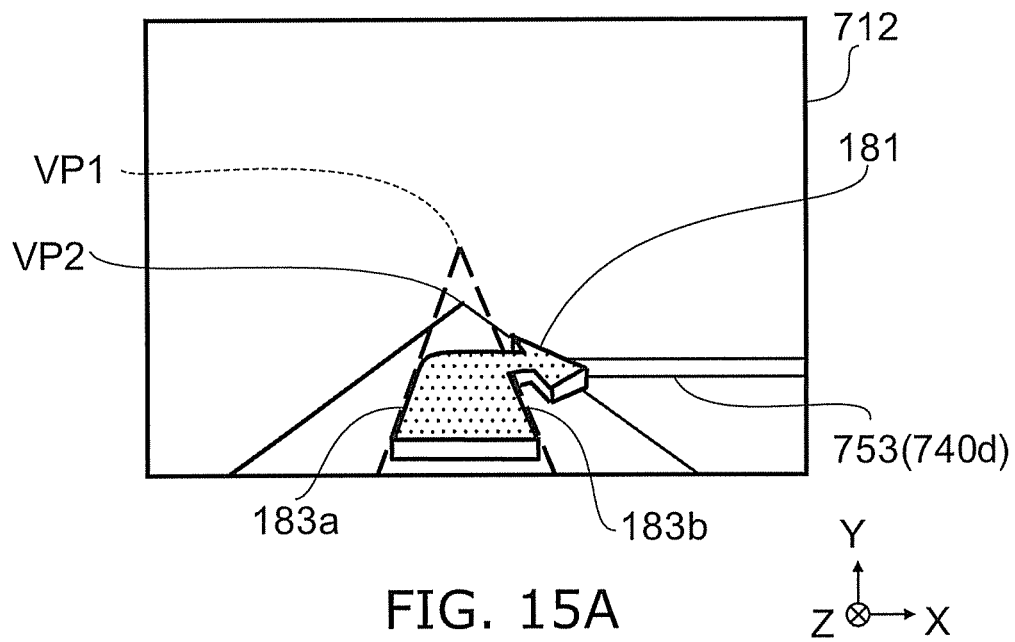
FIG. 15A and FIG. 15B are schematic views showing operations of the display device.
Figure 15B:
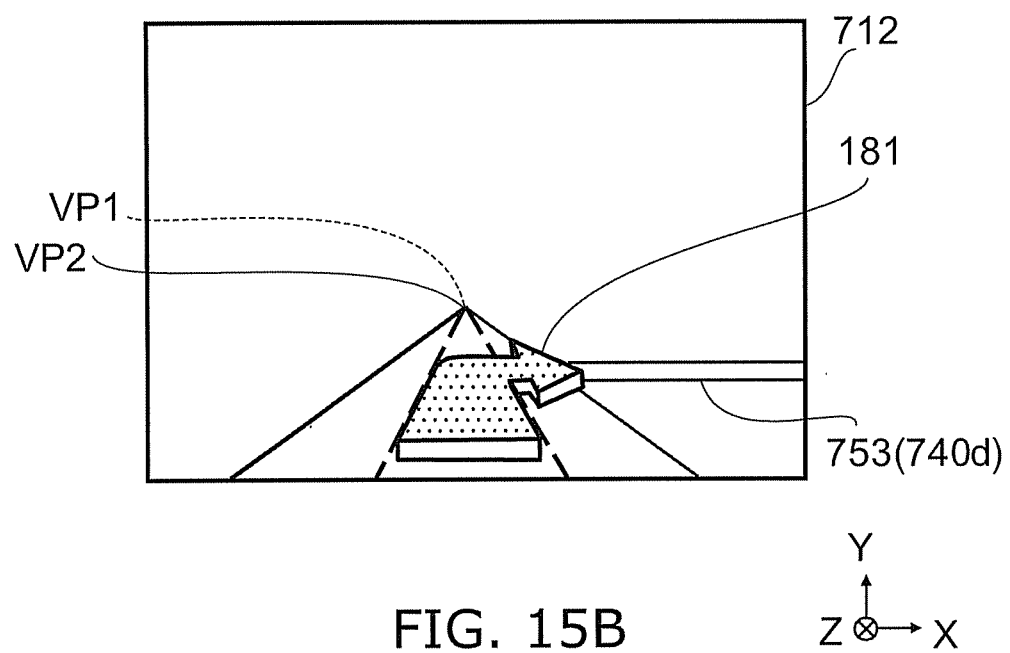

FIG. 15A and FIG. 15B are schematic views illustrating operations of the display device according to the first embodiment.

Namely, these drawings illustrate the display object 180 in the case where an arrow that provides a prompt to change the route to the right is used as the display object 180. In other words, the road 753 of the background image 740d has a branch road that branches to the right. FIG. 15A is an example in which the vanishing point VP1 of the display object 180 is disposed higher than the vanishing point VP2 of the background image 740d; and FIG. 15B is an example in which the vanishing point VP1 of the display object 180 matches the vanishing point VP2 of the background image 740d.

As shown in FIG. 15A, the angle between the two sides 183a and 183b of the shaft portion of the arrow of the display object 180 is relatively small. Thereby, the vanishing point VP1 of the display object 180 is disposed higher than the vanishing point VP2 of the background image 740d.

As shown in FIG. 15B, the angle between the sides 183a and 183b of the arrow of the display object 180 is relatively large. Thereby, the vanishing point VP1 of the display object 180 matches the vanishing point VP2 of the background image 740d.

In both FIGS. 15A and 15B, the tip of the arrow of the display object 180 is disposed in the direction of the branch road 753; and the arrow is bent to indicate the direction to change the route.

Thus, the vanishing point VP1 of the display object 180 can be changed by changing the angles of the sides 183a and 183b of the display object 180, i.e., the angles of the outlines of the display object 180.

The depthward set position of the display object can match the perceived depthward position of the display object with good precision by, for example, employing the configuration of the display object 180 illustrated in FIG. 15B when the depthward set distance Ld is not more than about 30 m and by, for example, employing the configuration of the display object 180 illustrated in FIG. 15A when the depthward set distance Ld is greater than about 30 m, e.g., 45 m or greater.

An example of a method for defining the target position PT of the display object 180 will now be described.

Figure 16:
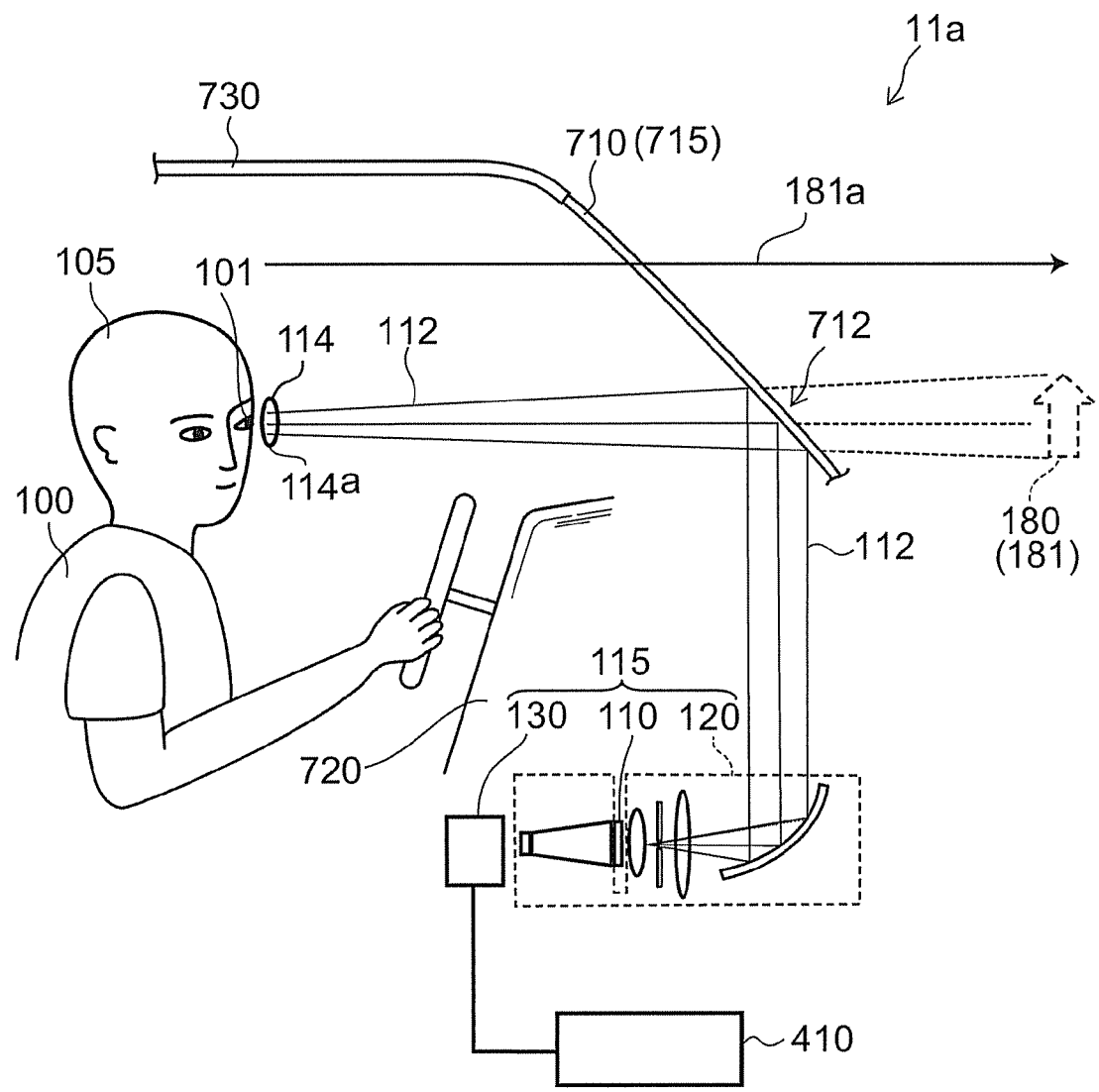
FIG. 16 is a schematic view showing another display device.

FIG. 16 is a schematic view illustrating the configuration of another display device according to the first embodiment.

As shown in FIG. 16, the display device 11a according to the embodiment further includes an external environment information acquisition unit 410 that acquires the external environment information of the vehicle 730 in which the image projection unit 115 is mounted.

The image projection unit 115 projects the light flux 112 by adjusting the vanishing point VP1 of the display object 180 to correspond to the target position PT of the display object 180 based on the external environment information acquired by the external environment information acquisition unit 410.

In other words, for example, the image data generation unit 130 of the image projection unit 115 generates the data relating to the image including the display object 180 based on the external environment information acquired by the external environment information acquisition unit 410; the image is formed by the image formation unit 110; and the light flux 112 is projected by the projection unit 120.

The external environment information acquisition unit 410 acquires, for example, the travel direction of the road, the width of the road, the configuration of the road, the existence of branch points, the configurations of branch points, etc., as the external environment information of the vehicle 730. Any method can be employed as this acquisition method, including methods that use a storage unit in which such external information is stored beforehand, various methods to acquire the external information by wireless communication as appropriate, etc. Examples of acquisition methods of the external information are described below.

Figure 17:
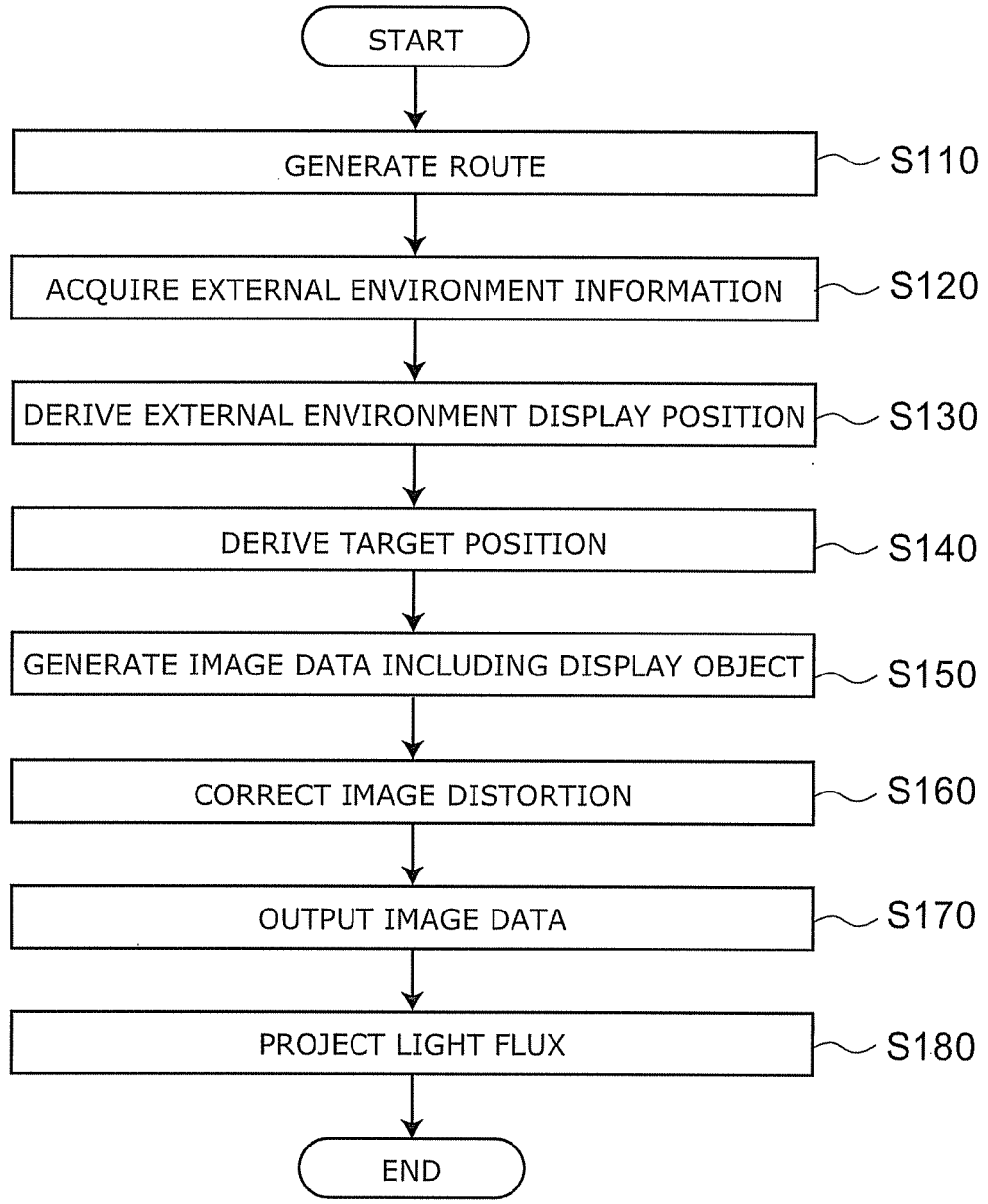
FIG. 17 is a flowchart showing operations of the display device.

FIG. 17 is a flowchart illustrating operations of another display device according to the first embodiment.

First, as shown in FIG. 17, for example, the route in which it is presumed that the vehicle 730 in which the display device 11a is mounted will travel is generated (step S110). For example, the route is generated based on the prescribed map information and the like by using the relationship between the current position of the vehicle 730 and the destination of the vehicle 730 determined by a GPS (Global Positioning System) function and the like. The generation of this route may be performed inside the display device 10 and by a navigation system and the like mounted in the vehicle; and this route may be generated using any method.

Then, the external environment information is acquired by the external environment information acquisition unit 410 (step S120). For example, information such as the state of the frontward road of the vehicle 730, the existence of branch points, etc., are acquired as the external environment information at the current position of the vehicle 730 from the relationship between the generated route and the current position of the vehicle 730 determined by a GPS function and the like.

Continuing, the external environment display position where the display object 180 is to be displayed such as the position of a branch point where the route is to be changed is derived (step S130).

Then, the target position PT of the display object 180 is derived based on the derived external environment display position (step S140). For example, the target position PT is determined based on the derived external environment display position (e.g., the position of the branch point) and the current position of the vehicle 730.

Continuing, the image data including the display object 180 is generated based on the target position PT (step S150). For example, the size, the configuration, and the position of the display object 180 inside the screen 110d are determined based on the target position PT and the position of the one eye 101 of the human viewer 100; and data of the display object 180 that has such a position, size, and configuration is generated.

At this time, the vanishing point VP1 of the display object 180 is adjusted in the display device 11a according to the embodiment. In other words, the positions of the vanishing point VP1 of the display object 180 and the vanishing point VP2 of the background image 740d are caused to be different or to match according to, for example, the depthward set distance Ld which is the distance to the target position PT of the display object 180. Whether to dispose the vanishing point VP1 of the display object 180 higher than or lower than the vanishing point VP2 of the background image 740d is changed according to whether the display object 180 is disposed lower than or higher than the human viewer 100 as viewed by the human viewer 100.

Then, the distortion of the image including the display object 180 is appropriately corrected (step S160); and the image data is outputted (step S170).

Step S130 to step S160 recited above may be executed in, for example, the image data generation unit 130. However, a portion of step S130 to step S170 may be executed in, for example, the external environment information acquisition unit 410 and other units.

Then, the image is formed by the image formation unit 110 based on the image data; and the light flux 112 including the image is projected toward the human viewer 100 by the projection unit 120 (step S180).

In step S150 recited above, the method for generating the data of the display object 180 by adjusting the position of the vanishing point VP1 of the display object 180 is arbitrary. For example, the image data in which the vanishing point VP1 is controlled is made at the initial stage in which the display object 180 is generated. The modifications relating to the size, the angle, the arrangement position, and the like are performed based on the image data. The modified image may be used as the image data of the final display object 180. Also, a modification of the image to change the vanishing point VP1 may be performed after performing the modification relating to the size, the angle, the arrangement position, and the like of the display object 180. In other words, when performing the shift of the vanishing point VP1 of the display object 180, a method can be employed in which the image data is generated after the shift value is provided. A method also can be employed in which the image data is modified further using the shift value after the image data is generated. A unit for performing such a calculation may be further provided separately from the image projection unit 115; and, for example, the image data generation unit 130 may be used to implement such a calculation inside the image projection unit 115.

Thus, the target position PT of the display object 180 can be efficiently derived and the control relating to the vanishing point VP1 of the display object 180 can be efficiently implemented by further including the external environment information acquisition unit 410.

The external environment information acquisition unit having the functions recited above may be provided outside the display device according to the embodiment; and the operations described above can be implemented by acquiring the necessary data from the external information acquisition unit provided externally.

Figure 18:
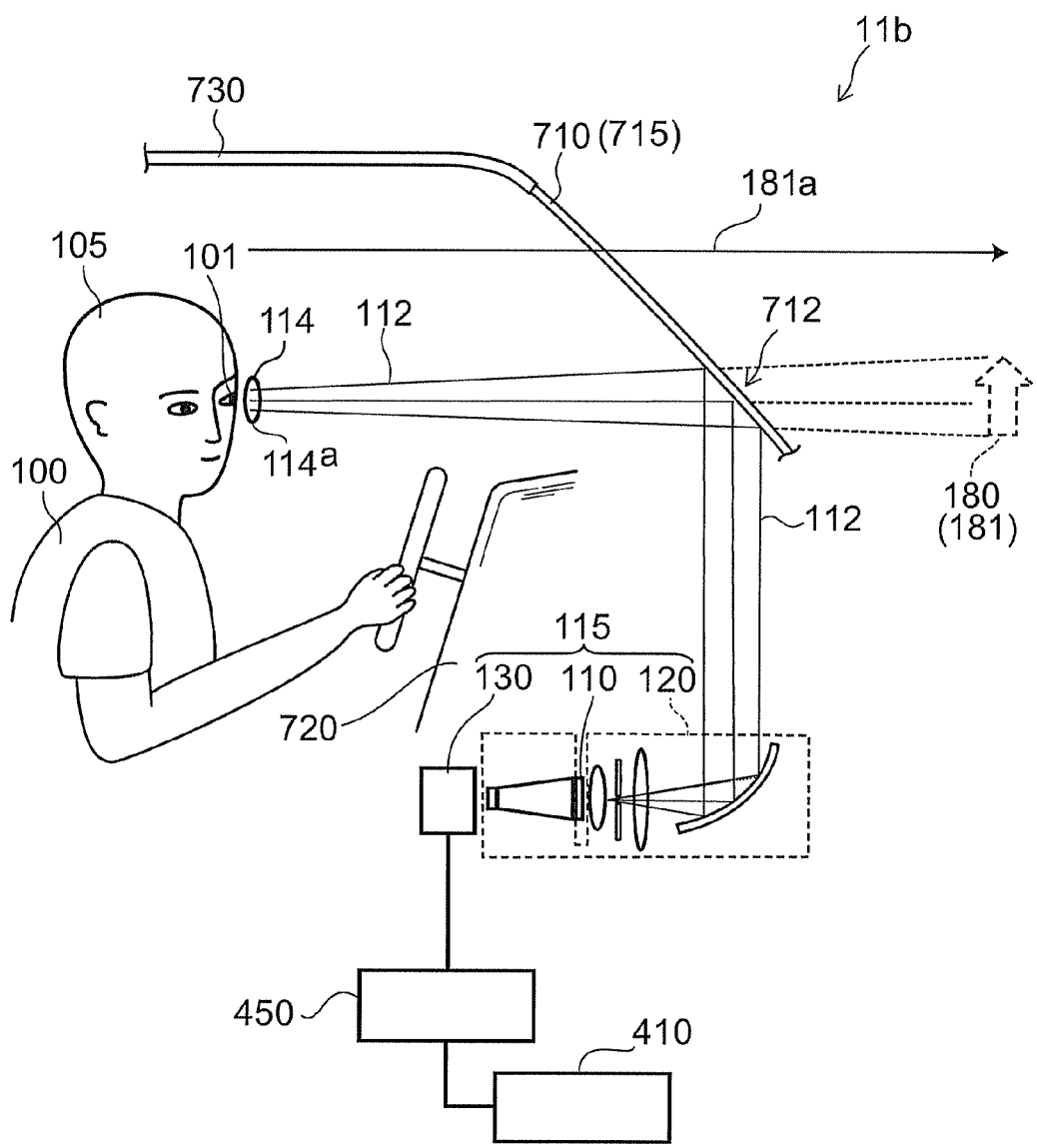
FIG. 18 is a schematic view showing the display device.

FIG. 18 is a schematic view illustrating the configuration of another display device according to the first embodiment.

As shown in FIG. 18, the display device 11b further includes a route generation unit 450 that generates the route in which it is presumed that the vehicle 730 will travel. Otherwise, the display device 11b may be similar to the display device 11a, and a description is omitted.

The route generation unit 450 calculates the route in which it is presumed that the vehicle 730 will travel based on the external environment information acquired by the external environment information acquisition unit 410 and, for example, the current position of the vehicle 730. At this time, for example, several route alternatives may be calculated; the human viewer 100 who is the operator of the vehicle 730 may be prompted for a selection; and the route may be determined based on the results.

Thus, the route can be generated efficiently inside the display device 11b by further providing the route generation unit 450.

Figure 19:
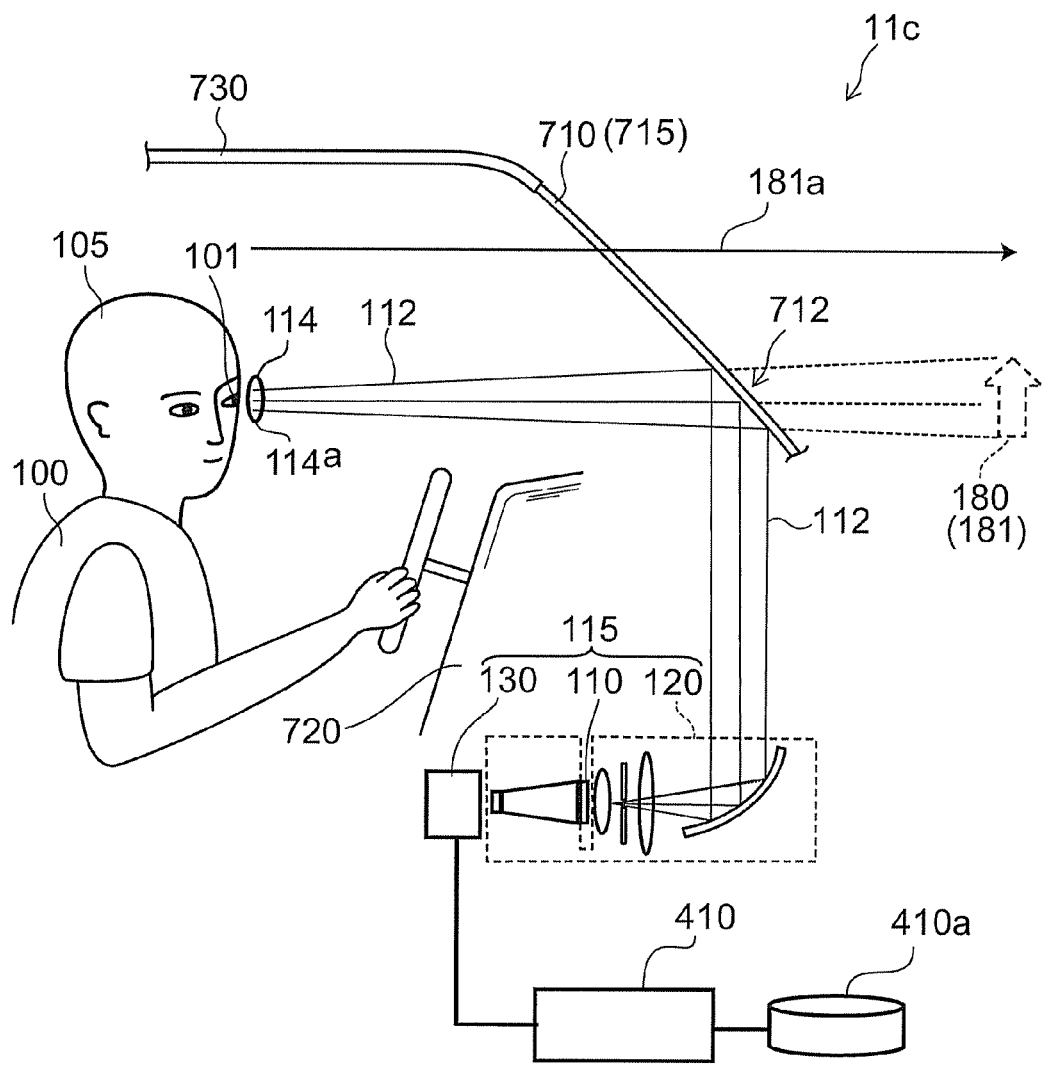
FIG. 19 is a schematic view showing the display device.

FIG. 19 is a schematic view illustrating the configuration of another display device according to the first embodiment.

As shown in FIG. 19, the display device 11c includes an external environment information data storage unit 410a in which the external environment information of the vehicle 730 is stored beforehand. Thereby, the external environment information acquisition unit 410 acquires data relating to the external environment information stored beforehand in the external environment information data storage unit 410a.

The external environment information data storage unit 410a may include a magnetic recording and reproducing device such as a HDD, etc., a recording device based on an optical method such as a CD, DVD, etc., and various storage devices using semiconductors.

Various information relating to the configurations of roads and branch points, place names, buildings, target objects, etc., outside the vehicle 730 may be stored as the external environment information of the vehicle 730 in the external environment information data storage unit 410a. Thereby, the external environment information acquisition unit 410 can read the external environment information from the external environment information data storage unit 410a based on the current position of the vehicle 730 and supply the external environment information to the image data generation unit 130.

When reading the information stored in the external environment information data storage unit 410a, the current position of the vehicle 730 (the human viewer 100) can be ascertained and the travel direction can be ascertained using, for example, GPS and the like; and the external environment information corresponding to the position and the travel direction can be read based on the position and the travel direction.

Figure 20:
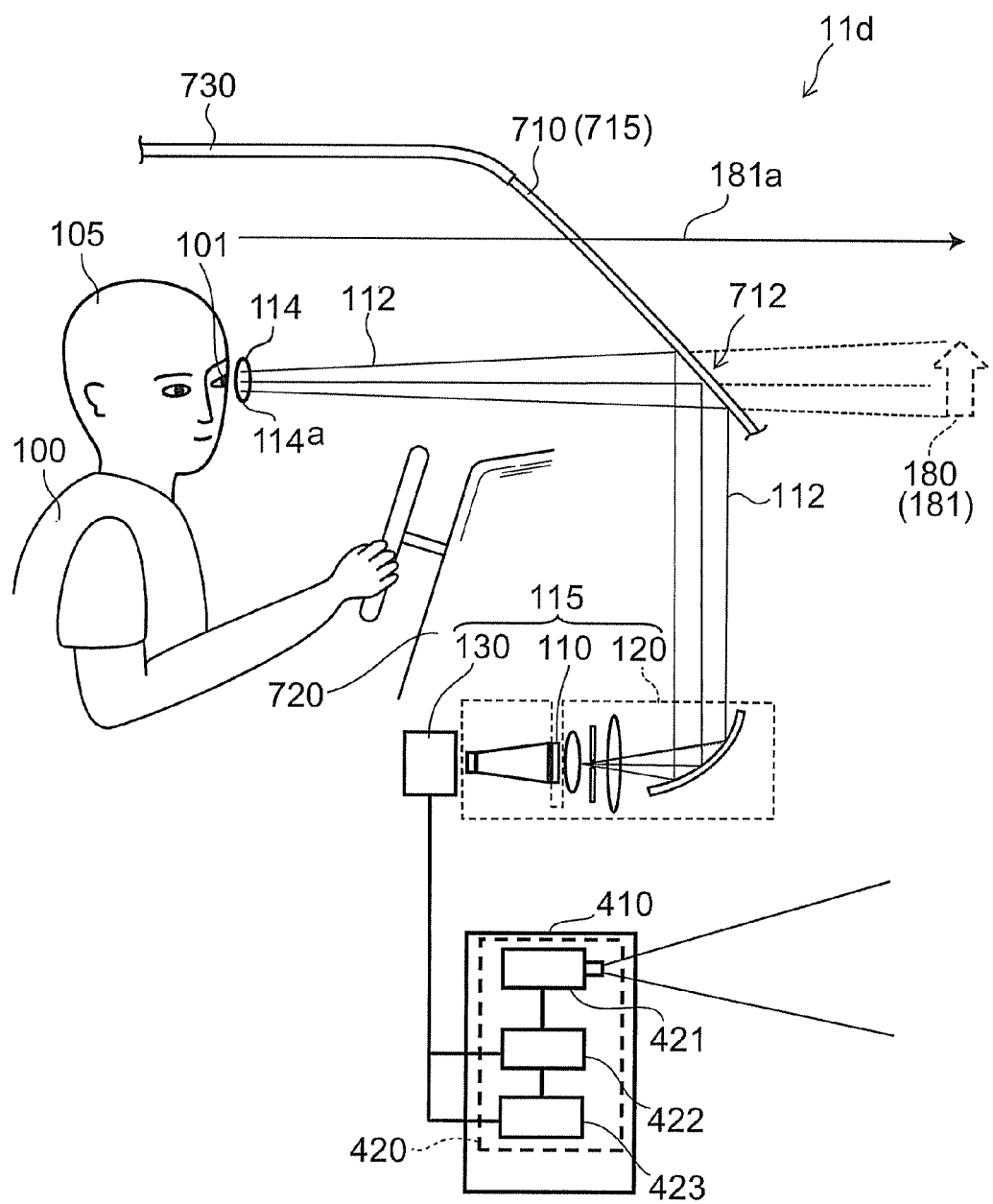
FIG. 20 is a schematic view showing the display device.

FIG. 20 is a schematic view illustrating the configuration of another display device according to the first embodiment.

As shown in FIG. 20, the external environment information acquisition unit 410 of the display device 11d includes an external environment information detection unit 420 configured to detect the frontward external environment information of the vehicle 730.

In the specific example, the external environment information detection unit 420 includes an external environment imaging unit 421 (a camera), an image analysis unit 422 configured to perform image analysis of the image that is captured by the external environment imaging unit 421, and an external environment information generation unit 423 that extracts various information relating to the configurations of roads and branch points, obstacles, etc., from the image analyzed by the image analysis unit 422 to generate the external environment information. Thereby, data relating to the road conditions of the external environment (the configurations of roads and branch points, obstacles, etc.) detected by the external environment information detection unit 420 are acquired. The external environment information detection unit 420 may be designed to generate the external environment information by reading a signal from various guidance signal emitters such as beacons and the like provided on the road on which the vehicle 730 travels.

Thus, the external environment information detection unit 420 that is configured to detect the frontward external environment information of the vehicle 730 is provided in the display device 11d according to the example. The external environment information acquisition unit 410 can acquire the frontward external environment information of the vehicle 730 that changes moment to moment. Thereby, the external environment information that changes moment to moment can be acquired; and the travel direction of the vehicle 730 can be calculated with better precision.

Figure 21:
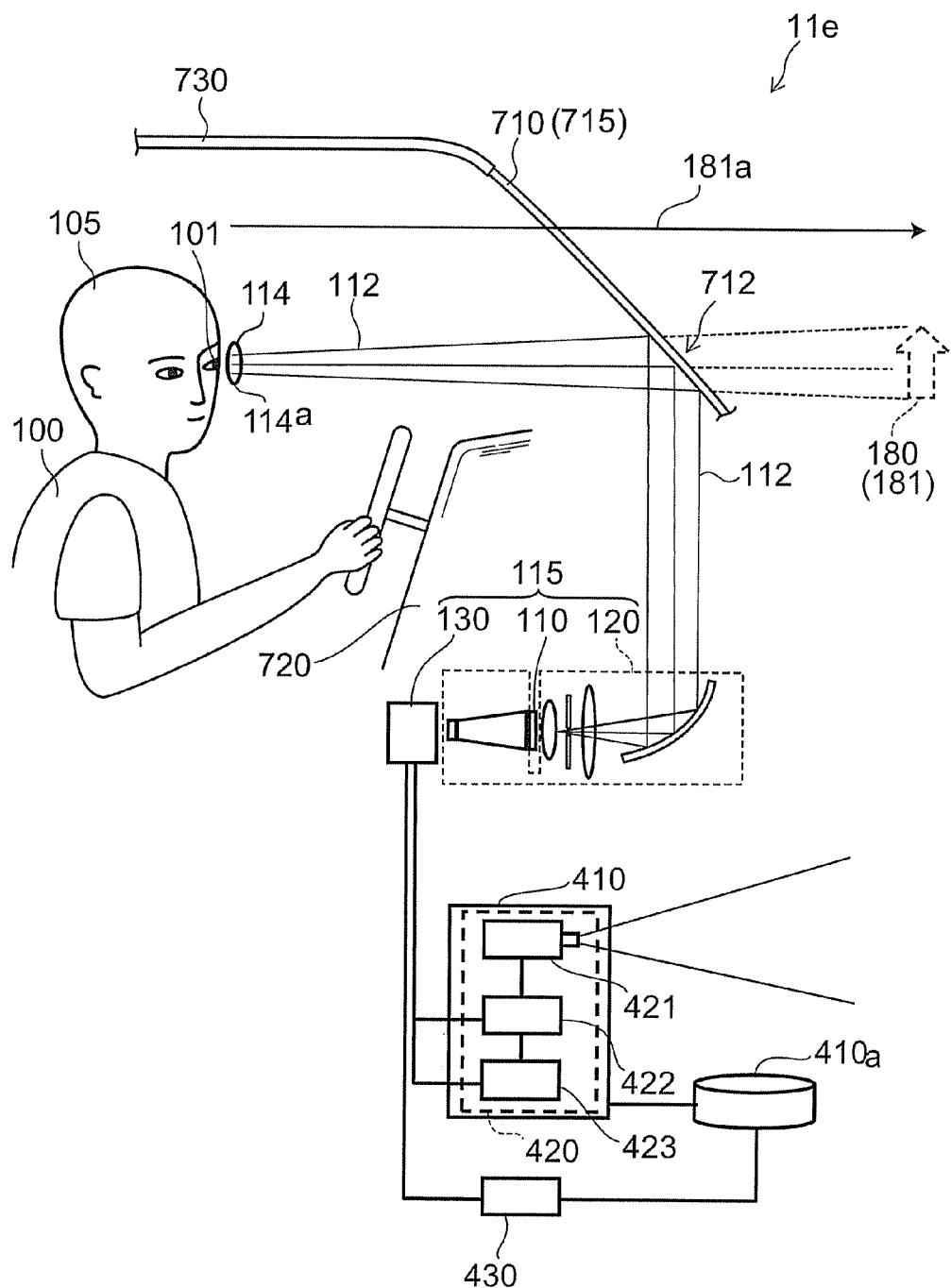
FIG. 21 is a schematic view showing the display device.

FIG. 21 is a schematic view illustrating the configuration of another display device according to the first embodiment.

As shown in FIG. 21, a vehicle position detection unit 430 that is configured to detect the position of the vehicle 730 is further provided in the display device 11e. The vehicle position detection unit 430 may use, for example, GPS. The display object 180 is generated based on the position of the vehicle 730 detected by the vehicle position detection unit 430.

In other words, the display object 180 is disposed based on the external environment information from the external environment information acquisition unit 410 and the position of the vehicle 730 detected by the vehicle position detection unit 430. Thereby, the display object 180 can be displayed based on the precise position of the vehicle 730.

At least one selected from the route generation unit 450, the external environment information data storage unit 410a, the external environment information detection unit 420, and the vehicle position detection unit 430 described above may be built into the image projection unit 115 of the display device.

At least one selected from the route generation unit 450, the external environment information data storage unit 410a, the external environment information detection unit 420, and the vehicle position detection unit 430 may be provided outside the display device according to the embodiment and may be provided outside the vehicle 730 in which the display device is mounted. In such a case, the operations recited above are performed by performing input/output of the data from units corresponding to the route generation unit, the external environment information data storage unit, the external environment information detection unit, and the vehicle position detection unit provided outside the vehicle 730 by using, for example, wireless technology and the like.

Figure 22:
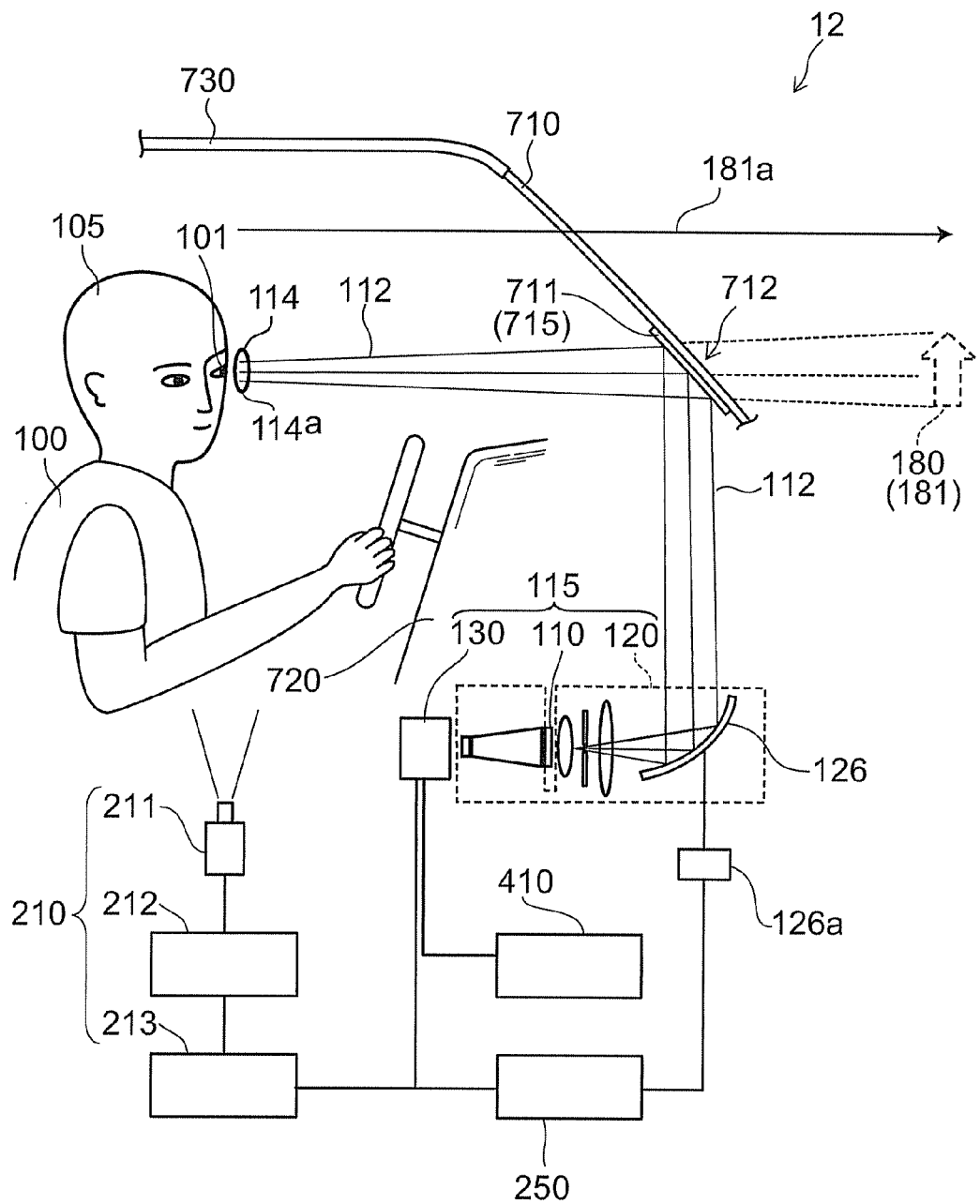
FIG. 22 is a schematic view showing the display device.

FIG. 22 is a schematic view illustrating the configuration of another display device according to the first embodiment.

In the display device 12 as shown in FIG. 22, the external environment information acquisition unit 410, a position detection unit 210, and a control unit 250 are further provided in the display device 10 illustrated in FIG. 2. The external environment information acquisition unit 410 may be similar to that recited above, and a description is omitted.

The position detection unit 210 is configured to detect the one eye 101 of the human viewer 100. The position detection unit 210 may include, for example, an imaging unit 211 configured to capture an image of the human viewer 100, an image processing unit 212 configured to perform image processing of the image captured by the imaging unit 211, and a calculation unit 213 configured to determine and detect the position of the one eye 101 of the human viewer 100 based on the data from the image processing of the image processing unit 212.

The calculation unit 213 determines and detects the position of the one eye 101 of the human viewer 100 onto which the image is to be projected by using face recognition of the human viewer 100 and calculating the eyeball positions as facial parts using any technology relating to personal authentication.

The imaging unit 211 is disposed, for example, frontward and/or sideward of the driver's seat of the vehicle 730 to capture, for example, an image of the face of the human viewer 100, i.e., the operator; and the position of the one eye 101 of the human viewer is detected as recited above.

The control unit 250 adjusts at least one selected from the projection area 114 and the projection position 114a of the light flux 112 by controlling the image projection unit 115 based on the position of the one eye 101 of the human viewer 100 detected by the position detection unit 210.

The control unit 250 controls, for example, the projection position 114a by controlling the angle of the mirror 126 by controlling a drive unit 126a linked to the mirror 126 which is a portion of the projection unit 120.

The control unit 250 can control the projection area 114 by controlling, for example, various optical parts included in the projection unit 120.

Thereby, it is possible to control the presentation position of the image to follow the head 105 of the human viewer 100 even in the case where the head 105 of the human viewer 100 moves. The image presentation position moving out of the position of the one eye 101 due to the movement of the head 105 of the human viewer 100 is suppressed; and a wider practical viewing area is possible.

The control unit 250 may adjust the luminance, the contrast, and the like of the image by, for example, controlling the image formation unit 110. Although the at least one selected from the projection area 114 and the projection position 114a of the light flux 112 is adjusted automatically by the control unit 250 based on the position of the detected one eye 101 in the specific example recited above, the embodiments are not limited thereto. For example, the at least one selected from the projection area 114 and the projection position 114a of the light flux 112 may be adjusted manually based on the position of the detected one eye 101. In such a case, the angle of the mirror 126 can be controlled by, for example, manually controlling the drive unit 126a while viewing the image of the head 105 of the human viewer 100 captured by the projection unit 120 on some kind of display.

In the display device 12 of the specific example, a combiner 711 (a reflective layer) is provided in the windshield 710. The combiner 711 may be used as the projection plate 715. The transmittance of the light of the background image 740d and/or the reflectance of the light flux 112 can be increased further by appropriately designing the optical characteristics of the combiner 711; and a display that is even easier to view can be realized.

At least two selected from the route generation unit 450, the external environment information data storage unit 410a, the external environment information detection unit 420, the vehicle position detection unit 430, the position detection unit 210, and the control unit 250 described above may be provided simultaneously.

Second Embodiment

Figure 23:
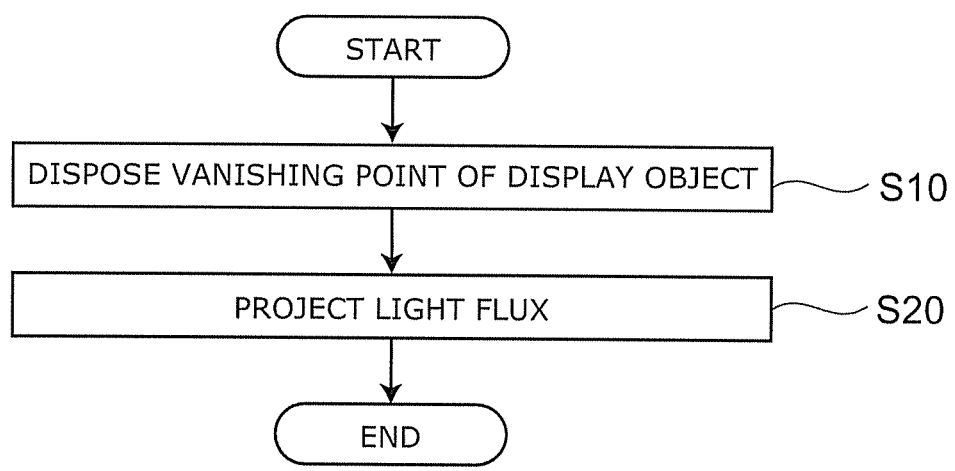
FIG. 23 is a flowchart illustrating a display method.

FIG. 23 is a flowchart illustrating the display method according to a second embodiment.

As shown in FIG. 23, the display method according to the embodiment projects the light flux 112 that includes the image including the display object 180 toward the one eye 101 of the human viewer 100 by using the reflective and transmissive projection plate 715 to reflect the light flux 112. The vanishing point VP1 of the display object 180 is disposed at a position different from that of the vanishing point VP2 of the background image 740d viewed by the human viewer 100 through the projection plate 715 (step S10).

Then, the light flux 112 that includes the image including the display object 180 is projected toward the one eye 101 of the human viewer 100 by using the projection plate 715 to reflect the light flux 112 (step S20).

For example, the vanishing point VP1 of the display object 180 is disposed higher than the vanishing point VP2 of the background image 740d in the case where the display object 180 is disposed lower than the human viewer 100 as viewed by the human viewer 100.

Then, for example, the vanishing point VP1 of the display object 180 is disposed lower than the vanishing point VP2 of the background image 740d in the case where the display object 180 is disposed higher than the human viewer 100 as viewed by the human viewer 100.

Thereby, the depthward set position of the display object can match the perceived depthward position of the display object with good precision by conforming to human depth perception.

According to the embodiments, a monocular display device and display method are provided in which the depthward set position of the display object and the perceived depthward position of the display object are matched with good precision.

Hereinabove, exemplary embodiments of the invention are described with reference to specific examples. However, the invention is not limited to these specific examples. For example, one skilled in the art may similarly practice the invention by appropriately selecting specific configurations of components such as image projection units, image data generation units, image formation units, projection units, light sources, diffuser plates, tapered light guides, lenses, apertures, mirrors, route generation units, external environment information data storage units, external environment information detection units, vehicle position detection units, position detection units, control units, etc., included in display devices from known art; and such practice is included in the scope of the invention to the extent that similar effects are obtained.

Further, any two or more components of the specific examples may be combined within the extent of technical feasibility and are included in the scope of the invention to the extent that the purport of the invention is included.

Moreover, all display devices practicable by an appropriate design modification by one skilled in the art based on the display devices described above as embodiments of the invention also are within the scope of the invention to the extent that the spirit of the invention is included.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A display device, comprising: an image projection unit configured to project a light flux toward one eye of a human viewer by using a projection plate to reflect the light flux, the light flux including an image including a display object having a vanishing point, the projection plate being reflective and transmissive,
   the image projection unit being configured to dispose the vanishing point of the display object at a position different from a position of a vanishing point of a background image viewed by the human viewer through the projection plate,
   wherein the image projection unit disposes the display object at a position lower than a position of a center of a reflective surface of the projection plate as viewed by the human viewer and disposes the vanishing point of the display object at a position higher than a position of the vanishing point of the background image as viewed by the human viewer.

2. The device according to claim 1, wherein the image projection unit includes a first lens, a second lens, and a divergence angle control element provided between the first lens and the second lens, the divergence angle control element being configured to control a divergence angle of the light flux.

3. The device according to claim 2, wherein the divergence angle control element is an aperture having an opening having a variable size.

4. The device according to claim 2, wherein
   the first lens has a first focal distance;
   the second lens has a second focal distance;
   a distance between the divergence angle control element and the first lens is the first focal distance; and
   a distance between the divergence angle control element and the second lens is the second focal distance.

5. The device according to claim 1, wherein
   the display object has a configuration including a first side and a second side; and
   an extension line of the first side intersects an extension line of the second side at the vanishing point of the display object.

6. The device according to claim 1, wherein a projection area of the light flux at a position of the human viewer has a lateral-direction width not more than 70 millimeters as viewed by the human viewer.

7. The device according to claim 1, wherein the image projection unit changes a difference between the vanishing point of the display object and the vanishing point of the background image based on a target position of the display object.

8. The device according to claim 7, wherein
   the image projection unit causes the position of the vanishing point of the display object to match the position of the vanishing point of the background image when a depthward set distance between the target position and a position of the one eye is not more than 30 meters, and
   the image projection unit causes the position of the vanishing point of the display object to be different from the position of the vanishing point of the background image when the depthward set distance is greater than 30 meters.

9. The device according to claim 8, wherein the image projection unit causes the position of the vanishing point of the display object to be different from the position of the vanishing point of the background image when the depthward set distance is not less than 45 meters.

10. The device according to claim 1, wherein
    the display device is mounted in a vehicle; and
    the projection plate is a windshield unit of the vehicle.

11. A display device, comprising: an image projection unit configured to project a light flux toward one eye of a human viewer by using a projection plate to reflect the light flux, the light flux including an image including a display object having a vanishing point, the projection plate being reflective and transmissive,
    the image projection unit being configured to dispose the vanishing point of the display object at a position different from a position of a vanishing point of a background image viewed by the human viewer through the projection plate,
    wherein the image projection unit disposes the display object at a position higher than a position of a center of a reflective surface of the projection plate as viewed by the human viewer and disposes the vanishing point of the display object at a position lower than a position of the vanishing point of the background image as viewed by the human viewer.

12. A display method, comprising:
    projecting a light flux including an image including a display object toward one eye of a human viewer by using a projection plate to reflect the light flux, the projection plate being reflective and transmissive;
    disposing a vanishing point of the display object at a position different from a position of a vanishing point of a background image viewed by the human viewer through the projection plate during the projecting toward the one eye;
    disposing the display object at a position lower than a position of a center of a reflective surface of the projection plate as viewed by the human viewer; and
    disposing the vanishing point of the display object at a position higher than a position of the vanishing point of the background image as viewed by the human viewer.

13. The method according to claim 12, wherein the projecting toward the one eye includes projecting the light flux toward the one eye by using the projection plate to reflect the light flux by using a first lens, a second lens, and a divergence angle control element provided between the first lens and the second lens, the divergence angle control element being configured to control a divergence angle of the light flux.

14. The method according to claim 13, further comprising:
    changing a difference between the vanishing point of the display object and the vanishing point of the background image based on a target position of the display object.

15. The method according to claim 14, wherein
    the image projection unit causes the position of the vanishing point of the display object to match the position of the vanishing point of the background image when a depthward set distance between the target position and a position of the one eye is not more than 30 meters; and the image projection unit causes the position of the vanishing point of the display object to be different from the position of the vanishing point of the background image when the depthward set distance is greater than 30 meters.

16. The method according to claim 15, wherein the image projection unit causes the position of the vanishing point of the display object to be different from the position of the vanishing point of the background image when the depthward set distance is not less than 45 meters.

17. The method according to claim 12, wherein
the projection plate is a windshield unit of the vehicle.

18. A display method, comprising:
projecting a light flux including an image including a display object toward one eye of a human viewer by using a projection plate to reflect the light flux, the projection plate being reflective and transmissive;
disposing a vanishing point of the display object at a position different from a position of a vanishing point of a background image viewed by the human viewer through the projection plate during the projecting toward the one eye;
disposing the display object at a position higher than a position of a center of a reflective surface of the reflection plate as viewed by the human viewer; and
disposing the vanishing point of the display object at a position lower than a position of the vanishing point of the background image as viewed by the human viewer.

* * * * *